(12) United States Patent
Tie et al.

(10) Patent No.: US 12,063,597 B2
(45) Date of Patent: Aug. 13, 2024

(54) COMMUNICATION METHOD AND DEVICE

(71) Applicant: HUAWEI TECHNOLOGIES CO., LTD., Guangdong (CN)

(72) Inventors: Xiaolei Tie, Shanghai (CN); Han Zhou, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 338 days.

(21) Appl. No.: 17/524,482

(22) Filed: Nov. 11, 2021

(65) Prior Publication Data

US 2022/0070780 A1    Mar. 3, 2022

Related U.S. Application Data

(63) Continuation of application No. PCT/CN2020/089466, filed on May 9, 2020.

(30) Foreign Application Priority Data

May 13, 2019   (CN) .......................... 201910395099.2

(51) Int. Cl.
*H04W 72/23* (2023.01)
*H04L 5/00* (2006.01)
(Continued)

(52) U.S. Cl.
CPC ....... *H04W 52/0232* (2013.01); *H04L 5/0051* (2013.01); *H04W 72/0446* (2013.01); *H04W 72/0453* (2013.01); *H04W 72/23* (2023.01)

(58) Field of Classification Search
CPC ..... H04L 27/2601; H04L 1/00; H04L 5/0053; H04L 5/0048; H04L 5/00; H04L 5/0051;
(Continued)

(56) References Cited

U.S. PATENT DOCUMENTS 9,392,595 B2 *  7/2016  Guan ................... H04W 28/06
11,218,974 B2 *  1/2022  Chen .................... H04W 72/23
(Continued)

FOREIGN PATENT DOCUMENTS

CN       104137440 A     11/2014
CN       108781432 A     11/2018
(Continued)

OTHER PUBLICATIONS

Extended European Search Report issued in European Application No. 20805392.6 on May 6, 2022, 8 pages.
(Continued)

*Primary Examiner* — Nathan S Taylor
(74) *Attorney, Agent, or Firm* — Fish & Richardson P.C.

(57) ABSTRACT

The present disclosure discloses an example communication method and device. One example communication method includes detecting first downlink control information (DCI) by a terminal device. It is determined, by the terminal device and based on a detection result of the first DCI, whether to receive a reference signal, where the reference signal is used by the terminal device to perform time and frequency synchronization with a network device, and the detection result of the first DCI is further used to indicate whether to detect a first downlink control channel within a first time period.

17 Claims, 7 Drawing Sheets

(51) Int. Cl.
*H04W 52/02* (2009.01)
*H04W 72/0446* (2023.01)
*H04W 72/0453* (2023.01)

(58) Field of Classification Search
CPC . H04W 28/0268; H04W 28/10; H04W 76/10; H04W 80/02; H04W 76/12; H04W 28/02; H04W 80/10; H04W 76/20; H04W 28/06; H04W 74/002; H04W 76/15; H04W 76/30; H04W 72/20; H04W 74/00; H04W 72/04; H04W 52/0232; H04W 56/0015; H04W 56/0035; H04W 72/0446; H04W 72/0453; H04W 72/23; H04W 56/001; H04W 52/02; H04W 56/00
See application file for complete search history.

(56) References Cited

U.S. PATENT DOCUMENTS

| | | | |
|---|---|---|---|
| 2018/0242317 A1 | 8/2018 | Marinier et al. | |
| 2019/0334577 A1* | 10/2019 | Damnjanovic | H04L 27/2602 |
| 2019/0373571 A1* | 12/2019 | Damnjanovic | H04B 17/318 |
| 2021/0084623 A1* | 3/2021 | Zhang | H04L 5/0053 |
| 2021/0219350 A1* | 7/2021 | Wu | H04L 69/324 |
| 2021/0351890 A1* | 11/2021 | Tang | H04L 5/0053 |
| 2022/0163614 A1* | 5/2022 | Wong | H04W 64/00 |
| 2022/0191938 A1* | 6/2022 | Luo | H04W 72/1273 |
| 2024/0022380 A1* | 1/2024 | Zhang | H04W 16/28 |

FOREIGN PATENT DOCUMENTS

| | | | | |
|---|---|---|---|---|
| CN | 109474991 A | | 3/2019 | |
| CN | 109587786 A | | 4/2019 | |
| EP | 2667648 A1 | * | 11/2013 | ........... H04L 1/0038 |
| EP | 2797243 A1 | | 10/2014 | |
| EP | 3694123 A1 | * | 8/2020 | ........... H04J 11/0069 |
| EP | 3697016 A1 | * | 8/2020 | ............. H04L 5/001 |
| EP | 3761549 A1 | * | 1/2021 | ........... H04L 1/0023 |
| WO | 2018171770 A1 | | 9/2018 | |

OTHER PUBLICATIONS

Qualcomm Incorporated, "PDCCH-based power saving channel design," 3GPP TSG-RAN WG1 #97, R1-1907294, Reno, USA, May 13-17, 2019, 16 pages.
Spreadtrum Communications, "Discussion on PDCCH-based power saving channel," 3GPP TSG RAN WG1 Meeting #97, R1-1906373, Reno, USA, May 13-17, 2019, 13 pages.
PCT International Search Report and Written Opinion issued in International Application No. PCT/CN2020/089466 on Aug. 11, 2020, 17 pages (with English translation).
Spreadtrum Communications, "Beam measurement, report, and indication," 3GPP TSG RAN WG1 Meeting 90bis, R1-1717743, Prague, Czech Republic, Oct. 9-13, 2017, 5 pages.
ITL, "On the CSI Measurement and Reports for LAA," 3GPP TSG RAN WG1 Meeting #82, R1-154542, Beijing, China, Aug. 24-28, 2015, 5 pages.
Office Action in Chinese Appln. No. 201910395099.2, dated Oct. 10, 2022, 6 pages (with English translation).

* cited by examiner

COMMUNICATION METHOD AND DEVICE

CROSS-REFERENCE TO RELATED APPLICATIONS

This application is a continuation of International Application No. PCT/CN2020/089466, filed on May 9, 2020, which claims priority to Chinese Patent Application No. 201910395099.2, filed on May 13, 2019. The disclosures of the aforementioned applications are hereby incorporated by reference in their entireties.

TECHNICAL FIELD

This application relates to the field of communications technologies, and in particular, to a communication method and device.

BACKGROUND

A terminal device first needs to perform time and frequency synchronization with a base station to receive downlink data from the base station or send uplink data to the base station. Because a cell-specific reference signal (CRS) is not defined in a new radio (NR) system, a terminal device in connected mode generally performs time and frequency synchronization with the base station by using a tracking reference signal (TRS) or a synchronization signal and physical broadcast channel block (SSB). As the TRS or the SSB is periodically sent, the terminal device periodically performs time and frequency synchronization with the base station.

However, the base station does not always schedule downlink data or uplink data for the terminal device as there is no data transmission between the base station and the terminal device in most cases. However, the terminal device still periodically performs time and frequency synchronization with the base station, which actually provides little practical benefit and instead causes high power consumption to the terminal device.

SUMMARY

Embodiments of this application provide a communication method and device, to reduce power consumption of a terminal device.

According to a first aspect, a first communication method is provided. The method includes: A terminal device detects first downlink control information DCI; and the terminal device determines, based on a detection result of the first DCI, whether to receive a reference signal, where the reference signal is used by the terminal device to perform time and frequency synchronization with a network device, and the detection result of the first DCI is further used to indicate whether to detect a first downlink control channel within a first time period.

The method may be performed by a first communication apparatus. The first communication apparatus may be a communication device or a communication apparatus, for example, a chip system, that can support a function required by the communication device to implement the method. For example, the communication device is a terminal device.

In this embodiment of this application, the terminal device may determine, based on the detection result of the first DCI, whether to receive the reference signal. If the terminal device determines not to receive the reference signal, the terminal device does not perform time and frequency synchronization with the network device. This reduces power consumption of the terminal device caused by time and frequency synchronization.

With reference to the first aspect, in a possible implementation of the first aspect, that the terminal device determines, based on the detection result of the first DCI, whether to receive the reference signal includes:
when the detection result is that the first DCI is detected, the terminal device determines to receive the reference signal;
when the detection result is that the first DCI is detected, and the first DCI indicates that the reference signal is to be sent, the terminal device determines to receive the reference signal;
when the detection result is that the first DCI is detected, and the first DCI indicates that the reference signal is not to be sent, the terminal device determines not to receive the reference signal; or
when the detection result is that no first DCI is detected, the terminal device determines not to receive the reference signal.

The terminal device may determine to receive the reference signal when detecting the first DCI, or determine not to receive the reference signal when detecting no first DCI. In this way, the network device does not need to provide excessive indications, and the terminal device does not need to read unnecessary indication information. This manner is simple. Alternatively, after detecting the first DCI, the terminal device may determine, based on an indication of the first DCI, whether to receive the reference signal. This indication manner is specific. In addition, the network device may not send the reference signal even if the first DCI is sent. For example, the network device needs to schedule downlink data, but the scheduled downlink data has a low requirement on demodulation, for example, a modulation order is relatively low. In this case, the terminal device does not need to perform time and frequency synchronization with the network device, and the network device may send only the first DCI but does not need the reference signal. The terminal device may complete operations such as receiving and demodulating downlink data, and does not need to perform time and frequency synchronization with the network device. This reduces power consumption of the terminal device.

With reference to the first aspect, in a possible implementation of the first aspect, the method further includes:
the terminal device receives a first message from the network device; and
the terminal device determines, based on the first message, that there is an association relationship between the first DCI and the reference signal.

That the terminal device determines, based on a detection result of the first DCI, whether to receive the reference signal includes: The terminal device determines, based on the detection result of the first DCI and the association relationship, whether to receive the reference signal.

The association relationship includes:
when the terminal device detects the first DCI, the terminal device detects the reference signal;
when the terminal device detects no first DCI, the terminal device does not detect the reference signal;
when the terminal device detects the first DCI, and the first DCI indicates that the reference signal is to be sent, the terminal device detects the reference signal; or when the terminal device detects the first DCI, and the first DCI indicates that the reference signal is not to be sent, the terminal device does not detect the reference signal.

The association relationship between the first DCI and the reference signal may be configured by the network device, so that the terminal device can determine, based on the detection result of the first DCI and the association relationship, whether to receive the reference signal. In this embodiment of this application, "detect" and "(determine to) receive" may be understood as a same concept.

With reference to the first aspect, in a possible implementation of the first aspect, when the detection result is that the first DCI is detected, and the first DCI indicates that the reference signal is not to be sent, the terminal device determines not to receive the reference signal. After the terminal device determines, based on the detection result of the first DCI, whether to receive the reference signal, the method further includes: The terminal device receives second DCI from the network device, where the second DCI is used to schedule data; and when a sending parameter that is of the data and that is indicated by the second DCI does not meet a preconfigured sending parameter, the terminal device determines not to transmit the data.

If the network device sends only the first DCI but does not send the reference signal, or if the terminal device detects only the first DCI but does not detect the reference signal, the terminal device cannot perform time and frequency synchronization with the network device. In this case, the terminal device may be incapable of completing a complex demodulation operation or the like. Therefore, in this case, scheduling of the network device may be limited. For the terminal device, the sending parameter indicated by the second DCI may be compared with the preconfigured sending parameter. If a requirement of the sending parameter indicated by the second DCI for the terminal device is higher than a requirement of the preconfigured sending parameter for the terminal device, (that is, the sending parameter indicated by the second DCI does not meet the preconfigured sending parameter), the terminal device may not transmit the data scheduled by using the second DCI. This reduces an error probability in transmission. For example, the sending parameter includes the modulation order. If the modulation order indicated by the second DCI is greater than a preconfigured modulation order, it indicates that the modulation order indicated by the second DCI does not meet the preconfigured modulation order. If the modulation order indicated by the second DCI is less than or equal to the preconfigured modulation order, it indicates that the modulation order indicated by the second DCI meets the preconfigured modulation order.

With reference to the first aspect, in a possible implementation of the first aspect, that the detection result of the first DCI is further used to indicate whether to detect the first downlink control channel within the first time period includes:

when the detection result is that the first DCI is detected, the detection result is used to indicate to detect the first downlink control channel within the first time period;

when the detection result is that the first DCI is detected and the first DCI indicates not to schedule the first downlink control channel, the detection result is used to indicate not to detect the first downlink control channel within the first time period;

when the detection result is that the first DCI is detected and the first DCI indicates to schedule the first downlink control channel, the detection result is used to indicate to detect the first downlink control channel within the first time period; or when the detection result is that no first DCI is detected, the detection result is used to indicate not to detect the first downlink control channel within the first time period.

The first DCI may implement a function of a WUS. The terminal device may determine to detect the first downlink control channel when detecting the first DCI, or determine not to detect the first downlink control channel when detecting no first DCI. In this way, the network device does not need to provide excessive indications, and the terminal device does not need to read unnecessary indication information. This manner is simple. Alternatively, after detecting the first DCI, the terminal device may determine, based on the indication of the first DCI, whether to detect the first downlink control channel. This indication manner is specific.

With reference to the first aspect, in a possible implementation of the first aspect, the first downlink control channel includes any one or combination of the following:

a downlink control channel masked by using a C-RNTI;
a downlink control channel masked by using a CS-RNTI;
a downlink control channel masked by using an INT-RNTI;
a downlink control channel masked by using an SFI-RNTI;
a downlink control channel masked by using an SP-CSI-RNTI;
a downlink control channel masked by using a TPC-PUCCH-RNTI;
a downlink control channel masked by using a TPC-PUSCH-RNTI; or
a downlink control channel masked by using a TPC-SRS-RNTI.

The first downlink control channel may be a downlink control channel affected by a DRX mechanism. In addition to the foregoing several control channels, the first downlink control channel may further include another downlink control channel. Alternatively, the first downlink control channel may not include the foregoing several downlink control channels, but include another downlink control channel. This is not specifically limited.

With reference to the first aspect, in a possible implementation of the first aspect, a time interval between a moment at which the terminal device receives the first DCI and a moment at which the terminal device receives the reference signal is greater than a first value.

The terminal device can receive the first DCI through a narrowband, and the terminal device receives the reference signal through a wideband. Therefore, after receiving the first DCI, the terminal device needs to take a specific preparation time to start or switch a corresponding component, or the like. In view of this, in this embodiment of this application, the time interval between the moment at which the terminal device receives the first DCI and the moment at which the terminal device receives the reference signal is greater than the first value, left sufficient preparation time for the terminal device. For example, the first value is determined based on a capability of the terminal device. For example, the terminal device may send capability information to the network device, so that the network device can determine the first value. Alternatively, the first value may be specified in a protocol.

With reference to the first aspect, in a possible implementation of the first aspect, the reference signal is a CSI-RS, a TRS, or an SSB.

The reference signal may be used by the terminal device to perform time and frequency synchronization with the network device, or the reference signal may be used for another purpose. In addition, the reference signal may be another type of signal in addition to the foregoing several types of signals. A type of the reference signal is not limited in this embodiment of this application.

According to a second aspect, a second communication method is provided. The method includes: A network device determines an association relationship between first DCI and a reference signal, where the reference signal is used by a terminal device to perform time and frequency synchronization with the network device, and a sending result of the first DCI is used to indicate whether to detect a first downlink control channel within a first time period; and the network device sends a first message to the terminal device, where the first message is used to indicate the association relationship.

The method may be performed by a second communication apparatus. The second communication apparatus may be a communication device or a communication apparatus, for example, a chip system, that can support a function required by the communication device to implement the method. For example, the communication device is a network device.

With reference to the second aspect, in a possible implementation of the second aspect, the association relationship includes:
  when the network device sends the first DCI, the network device sends the reference signal;
  when the network device does not send the first DCI, the network device does not send the reference signal;
  when the network device sends the first DCI, and the first DCI indicates that the reference signal is to be sent, the network device sends the reference signal; or
  when the network device sends the first DCI, and the first DCI indicates that the reference signal is not to be sent, the network device does not send the reference signal.

With reference to the second aspect, in a possible implementation of the second aspect, that a sending result of the first DCI is used to indicate whether to detect a first downlink control channel within a first time period includes:
  when the sending result is that the first DCI is sent, the sending result is used to indicate to detect the first downlink control channel within the first time period;
  when the sending result is that the first DCI is sent, and the first DCI indicates not to schedule the first downlink control channel, the sending result is used to indicate not to detect the first downlink control channel within the first time period;
  when the sending result is that the first DCI is sent, and the first DCI indicates to schedule the first downlink control channel, the sending result is used to indicate to detect the first downlink control channel within the first time period; or
  when the sending result is that the first DCI is not sent, the sending result is used to indicate not to detect the first downlink control channel within the first time period.

With reference to the second aspect, in a possible implementation of the second aspect, the method further includes:
  The network device sends the first DCI to the terminal device, where the first DCI indicates that the reference signal is not to be sent; and
  the network device sends second DCI to the terminal device, where the second DCI is used to schedule data, and a sending parameter that is of the data and that is indicated by the second DCI meets a preconfigured sending parameter.

With reference to the second aspect, in a possible implementation of the second aspect, a time interval between a moment at which the network device sends the first DCI and a moment at which the network device sends the reference signal is greater than a first value.

With reference to the second aspect, in a possible implementation of the second aspect, the reference signal is a CSI-RS, a TRS, or an SSB.

For technical effects of the second aspect or the possible implementations of the second aspect, refer to the descriptions of the technical effects of the first aspect or the corresponding implementations of the first aspect.

According to a third aspect, a first type of communication apparatus is provided. For example, the communication apparatus is the first communication apparatus described above. The communication apparatus is configured to perform the method according to any one of the first aspect or the possible implementations of the first aspect. Specifically, the communication apparatus may include modules configured to perform the method according to any one of the first aspect or the possible implementations of the first aspect. For example, the communication apparatus includes a processing module and a transceiver module. For example, the communication apparatus is a communication device. For example, the communication device is a terminal device.

The transceiver module is configured to detect first downlink control information DCI.

The processing module is configured to determine, based on a detection result of the first DCI, whether to receive a reference signal, where the reference signal is used by the communication apparatus to perform time and frequency synchronization with a network device, and the detection result of the first DCI is further used to indicate whether to detect a first downlink control channel within a first time period.

With reference to the third aspect, in a possible implementation of the third aspect, the processing module is configured to determine, in the following manner and based on the detection result of the first DCI, whether to receive the reference signal:
  when the detection result is that the first DCI is detected, determining to receive the reference signal;
  when the detection result is that the first DCI is detected, and the first DCI indicates that the reference signal is to be sent, determining to receive the reference signal;
  when the detection result is that the first DCI is detected, and the first DCI indicates that the reference signal is not to be sent, determining not to receive the reference signal; or
  when the detection result is that no first DCI is detected, determining not to receive the reference signal.

With reference to the third aspect, in a possible implementation of the third aspect,
  the transceiver module is further configured to receive a first message from the network device;
  the processing module is further configured to determine, based on the first message, that there is an association relationship between the first DCI and the reference signal; and
  the processing module is configured to determine, in the following manner and based on the detection result of the first DCI, whether to receive the reference signal: determining, based on the detection result of the first DCI and the association relationship, whether to receive the reference signal.

The association relationship includes:
when the communication apparatus detects the first DCI, the communication apparatus detects the reference signal;
when the communication apparatus detects no first DCI, the communication apparatus does not detect the reference signal;
when the communication apparatus detects the first DCI, and the first DCI indicates that the reference signal is to be sent, the communication apparatus detects the reference signal; or
when the communication apparatus detects the first DCI, and the first DCI indicates that the reference signal is not to be sent, the communication apparatus does not detect the reference signal.

With reference to the third aspect, in a possible implementation of the third aspect, when the detection result is that the first DCI is detected, and the first DCI indicates that the reference signal is not to be sent, the processing module determines not to receive the reference signal.

The transceiver module is further configured to: after the processing module determines, based on the detection result of the first DCI, whether to receive the reference signal, receive second DCI from the network device, where the second DCI is used to schedule data.

The processing module is further configured to: when a sending parameter that is of the data and that is indicated by the second DCI does not meet a preconfigured sending parameter, determine not to transmit the data.

With reference to the third aspect, in a possible implementation of the third aspect, that the detection result of the first DCI is further used to indicate whether to detect a first downlink control channel within a first time period includes:
when the detection result is that the first DCI is detected, the detection result is used to indicate to detect the first downlink control channel within the first time period;
when the detection result is that the first DCI is detected and the first DCI indicates not to schedule the first downlink control channel, the detection result is used to indicate not to detect the first downlink control channel within the first time period;
when the detection result is that the first DCI is detected and the first DCI indicates to schedule the first downlink control channel, the detection result is used to indicate to detect the first downlink control channel within the first time period; or
when the detection result is that no first DCI is detected, the detection result is used to indicate not to detect the first downlink control channel within the first time period.

With reference to the third aspect, in a possible implementation of the third aspect, the first downlink control channel includes any one or combination of the following:
a downlink control channel masked by using a C-RNTI;
a downlink control channel masked by using a CS-RNTI;
a downlink control channel masked by using an INT-RNTI;
a downlink control channel masked by using an SFI-RNTI;
a downlink control channel masked by using an SP-CSI-RNTI;
a downlink control channel masked by using a TPC-PUCCH-RNTI;
a downlink control channel masked by using a TPC-PUSCH-RNTI; or
a downlink control channel masked by using a TPC-SRS-RNTI.

With reference to the third aspect, in a possible implementation of the third aspect, a time interval between a moment at which the communication apparatus receives the first DCI and a moment at which the communication apparatus receives the reference signal is greater than a first value.

With reference to the third aspect, in a possible implementation of the third aspect, the reference signal is a CSI-RS, a TRS, or an SSB.

For technical effects of the third aspect or the possible implementations of the third aspect, refer to the descriptions of the technical effects of the first aspect or the corresponding implementations of the first aspect.

According to a fourth aspect, a second type of communication apparatus is provided. For example, the communication apparatus is the second communication apparatus described above. The communication apparatus is configured to perform the method according to any one of the second aspect or the possible implementations of the second aspect. Specifically, the communication apparatus may include modules configured to perform the method according to any one of the second aspect or the possible implementations of the second aspect. For example, the communication apparatus includes a processing module and a transceiver module. For example, the communication apparatus is a communication device. For example, the communication device is a network device.

The processing module is configured to determine an association relationship between first DCI and a reference signal, where the reference signal is used by a terminal device to perform time and frequency synchronization with the communication apparatus, and a sending result of the first DCI is used to indicate whether to detect a first downlink control channel within a first time period.

The transceiver module is configured to send a first message to the terminal device, where the first message is used to indicate the association relationship.

With reference to the fourth aspect, in a possible implementation of the fourth aspect, the association relationship includes:
when the communication apparatus sends the first DCI, the communication apparatus sends the reference signal;
when the communication apparatus does not send the first DCI, the communication apparatus does not send the reference signal;
when the communication apparatus sends the first DCI, and the first DCI indicates that the reference signal is to be sent, the communication apparatus sends the reference signal; or
when the communication apparatus sends the first DCI, and the first DCI indicates that the reference signal is not to be sent, the communication apparatus does not send the reference signal.

With reference to the fourth aspect, in a possible implementation of the fourth aspect, that a sending result of the first DCI is used to indicate whether to detect a first downlink control channel within a first time period includes:
when the sending result is that the first DCI is sent, the sending result is used to indicate to detect the first downlink control channel within the first time period;
when the sending result is that the first DCI is sent, and the first DCI indicates not to schedule the first downlink control channel, the sending result is used to indicate not to detect the first downlink control channel within the first time period;

when the sending result is that the first DCI is sent, and the first DCI indicates to schedule the first downlink control channel, the sending result is used to indicate to detect the first downlink control channel within the first time period; or when the sending result is that the first DCI is not sent, the sending result is used to indicate not to detect the first downlink control channel within the first time period.

With reference to the fourth aspect, in a possible implementation of the fourth aspect, the transceiver module is further configured to:

send the first DCI to the terminal device, where the first DCI indicates that the reference signal is not to be sent; and send second DCI to the terminal device, where the second DCI is used to schedule data, and a sending parameter that is of the data and that is indicated by the second DCI meets a preconfigured sending parameter.

With reference to the fourth aspect, in a possible implementation of the fourth aspect, a time interval between a moment at which the communication apparatus sends the first DCI and a moment at which the communication apparatus sends the reference signal is greater than a first value.

With reference to the fourth aspect, in a possible implementation of the fourth aspect, the reference signal is a CSI-RS, a TRS, or an SSB.

For technical effects of the fourth aspect or the possible implementations of the fourth aspect, refer to the descriptions of the technical effects of the second aspect or the corresponding implementations of the second aspect.

According to a fifth aspect, a third type of communication apparatus is provided. For example, the communication apparatus is the first communication apparatus described above. The communication apparatus includes a processor and a transceiver. The processor and the transceiver are coupled to each other, and are configured to implement the method described in the first aspect or the possible designs of the first aspect. For example, the communication apparatus is a chip disposed in a communication device. For example, the communication device is a terminal device. The transceiver is implemented by using an antenna, a feeder, a codec, or the like in the communication device. Alternatively, if the communication apparatus is a chip disposed in the communication device, the transceiver is, for example, a communication interface in the chip. The communication interface is connected to a radio frequency transceiver component in the communication device, to send or receive information through the radio frequency transceiver component.

The transceiver is configured to detect first downlink control information DCI.

The processor is configured to determine, based on a detection result of the first DCI, whether to receive a reference signal, where the reference signal is used by the communication apparatus to perform time and frequency synchronization with a network device, and the detection result of the first DCI is further used to indicate whether to detect a first downlink control channel within a first time period.

With reference to the fifth aspect, in a possible implementation of the fifth aspect, the processor is configured to determine, in the following manner and based on the detection result of the first DCI, whether to receive the reference signal:

when the detection result is that the first DCI is detected, determining to receive the reference signal;

when the detection result is that the first DCI is detected, and the first DCI indicates that the reference signal is to be sent, determining to receive the reference signal;

when the detection result is that the first DCI is detected, and the first DCI indicates that the reference signal is not to be sent, determining not to receive the reference signal; or when the detection result is that no first DCI is detected, determining not to receive the reference signal.

With reference to the fifth aspect, in a possible implementation of the fifth aspect, the transceiver is further configured to receive a first message from the network device;

the processor is further configured to determine, based on the first message, that there is an association relationship between the first DCI and the reference signal; and the processor is configured to determine, in the following manner and based on the detection result of the first DCI, whether to receive the reference signal: determining, based on the detection result of the first DCI and the association relationship, whether to receive the reference signal.

The association relationship includes:

when the communication apparatus detects the first DCI, the communication apparatus detects the reference signal;

when the communication apparatus detects no first DCI, the communication apparatus does not detect the reference signal;

when the communication apparatus detects the first DCI, and the first DCI indicates that the reference signal is to be sent, the communication apparatus detects the reference signal; or when the communication apparatus detects the first DCI, and the first DCI indicates that the reference signal is not to be sent, the communication apparatus does not detect the reference signal.

With reference to the fifth aspect, in a possible implementation of the fifth aspect, when the detection result is that the first DCI is detected, and the first DCI indicates that the reference signal is not to be sent, the processor determines not to receive the reference signal.

The transceiver is further configured to: after the processor determines, based on the detection result of the first DCI, whether to receive the reference signal, receive second DCI from the network device, where the second DCI is used to schedule data.

The processor is further configured to: when a sending parameter that is of the data and that is indicated by the second DCI does not meet a preconfigured sending parameter, determine not to transmit the data.

With reference to the fifth aspect, in a possible implementation of the fifth aspect, that the detection result of the first DCI is further used to indicate whether to detect a first downlink control channel within a first time period includes:

when the detection result is that the first DCI is detected, the detection result is used to indicate to detect the first downlink control channel within the first time period;

when the detection result is that the first DCI is detected and the first DCI indicates not to schedule the first downlink control channel, the detection result is used to indicate not to detect the first downlink control channel within the first time period;

when the detection result is that the first DCI is detected and the first DCI indicates to schedule the first downlink control channel, the detection result is used to indicate to detect the first downlink control channel within the first time period; or when the detection result is that no first DCI is detected, the detection result is used to indicate not to detect the first downlink control channel within the first time period.

With reference to the fifth aspect, in a possible implementation of the fifth aspect, the first downlink control channel includes any one or combination of the following:

a downlink control channel masked by using a C-RNTI;
a downlink control channel masked by using a CS-RNTI;
a downlink control channel masked by using an INT-RNTI;
a downlink control channel masked by using an SFI-RNTI;
a downlink control channel masked by using an SP-CSI-RNTI;
a downlink control channel masked by using a TPC-PUCCH-RNTI;
a downlink control channel masked by using a TPC-PUSCH-RNTI; or
a downlink control channel masked by using a TPC-SRS-RNTI.

With reference to the fifth aspect, in a possible implementation of the fifth aspect, a time interval between a moment at which the communication apparatus receives the first DCI and a moment at which the communication apparatus receives the reference signal is greater than a first value.

With reference to the fifth aspect, in a possible implementation of the fifth aspect, the reference signal is a CSI-RS, a TRS, or an SSB.

For technical effects of the fifth aspect or the possible implementations of the fifth aspect, refer to the descriptions of the technical effects of the first aspect or the corresponding implementations of the first aspect.

According to a sixth aspect, a fourth type of communication apparatus is provided. For example, the communication apparatus is the fourth communication apparatus described above. The communication apparatus includes a processor and a transceiver. The processor and the transceiver are coupled to each other, and are configured to implement the method described in the second aspect or the possible designs of the second aspect. For example, the communication apparatus is a chip disposed in a communication device. For example, the communication device is a network device. The transceiver is implemented by using an antenna, a feeder, a codec, or the like in the communication device. Alternatively, if the communication apparatus is the chip disposed in the communication device, the transceiver is, for example, a communication interface in the chip. The communication interface is connected to a radio frequency transceiver component in the communication device, to send or receive information through the radio frequency transceiver component.

The processor is configured to determine an association relationship between first DCI and a reference signal, where the reference signal is used by a terminal device to perform time and frequency synchronization with the communication apparatus, and a sending result of the first DCI is used to indicate whether to detect a first downlink control channel within a first time period.

The transceiver is configured to send a first message to the terminal device, where the first message is used to indicate the association relationship.

With reference to the sixth aspect, in a possible implementation of the sixth aspect, the association relationship includes:

when the communication apparatus sends the first DCI, the communication apparatus sends the reference signal;
when the communication apparatus does not send the first DCI, the communication apparatus does not send the reference signal;
when the communication apparatus sends the first DCI, and the first DCI indicates that the reference signal is to be sent, the communication apparatus sends the reference signal; or
when the communication apparatus sends the first DCI, and the first DCI indicates that the reference signal is not to be sent, the communication apparatus does not send the reference signal.

With reference to the sixth aspect, in a possible implementation of the sixth aspect, that a sending result of the first DCI is used to indicate whether to detect a first downlink control channel within a first time period includes:

when the sending result is that the first DCI is sent, the sending result is used to indicate to detect the first downlink control channel within the first time period;
when the sending result is that the first DCI is sent, and the first DCI indicates not to schedule the first downlink control channel, the sending result is used to indicate not to detect the first downlink control channel within the first time period;
when the sending result is that the first DCI is sent, and the first DCI indicates to schedule the first downlink control channel, the sending result is used to indicate to detect the first downlink control channel within the first time period; or
when the sending result is that the first DCI is not sent, the sending result is used to indicate not to detect the first downlink control channel within the first time period.

With reference to the sixth aspect, in a possible implementation of the sixth aspect, the transceiver is further configured to:

send the first DCI to the terminal device, where the first DCI indicates that the reference signal is not to be sent; and
send second DCI to the terminal device, where the second DCI is used to schedule data, and a sending parameter that is of the data and that is indicated by the second DCI meets a preconfigured sending parameter.

With reference to the sixth aspect, in a possible implementation of the sixth aspect, a time interval between a moment at which the communication apparatus sends the first DCI and a moment at which the communication apparatus sends the reference signal is greater than a first value.

With reference to the sixth aspect, in a possible implementation of the sixth aspect, the reference signal is a CSI-RS, a TRS, or an SSB.

For technical effects of the sixth aspect or the possible implementations of the sixth aspect, refer to the descriptions of the technical effects of the second aspect or the corresponding implementations of the second aspect.

According to a seventh aspect, a fifth type of communication apparatus is provided. The communication apparatus may be the first communication apparatus in the foregoing method designs. For example, the communication apparatus is a chip disposed in a communication device. For example, the communication device is a terminal device. The communication apparatus includes: a memory, configured to store computer-executable program code; and a processor, where the processor is coupled to the memory. The program code stored in the memory includes instructions, and when the processor executes the instructions, the fifth type of communication apparatus is enabled to perform the method in any one of the first aspect or the possible implementations of the first aspect.

The fifth type of communication apparatus may further include a communication interface. The communication interface may be a transceiver in the terminal device, for example, implemented by using an antenna, a feeder, or a codec in the communication apparatus. Alternatively, if the fifth type of communication apparatus is a chip disposed in the terminal device, the communication interface may be an input/output interface of the chip, for example, an input/output pin.

According to an eighth aspect, a sixth type of communication apparatus is provided. The communication apparatus may be the second communication apparatus in the foregoing method designs. For example, the communication apparatus is a chip disposed in a communication device. For example, the communication device is a network device. The communication apparatus includes: a memory, configured to store computer-executable program code; and a processor, where the processor is coupled to the memory. The program code stored in the memory includes instructions, and when the processor executes the instructions, the sixth type of communication apparatus is enabled to perform the method in any one of the second aspect or the possible implementations of the second aspect.

The sixth type of communication apparatus may further include a communication interface. The communication interface may be a transceiver in the network device, for example, implemented by using an antenna, a feeder, or a codec in the communication apparatus. Alternatively, if the sixth type of communication apparatus is a chip disposed in the network device, the communication interface may be an input/output interface of the chip, for example, an input/output pin.

According to a ninth aspect, a communication system is provided. The communication system may include the first type of communication apparatus according to the third aspect, the third type of communication apparatus according to the fifth aspect, or the fifth type of communication apparatus according to the seventh aspect; and includes the second type of communication apparatus according to the fourth aspect, the fourth type of communication apparatus according to the sixth aspect, or the sixth type of communication apparatus according to the eighth aspect.

According to a tenth aspect, a computer storage medium is provided. The computer-readable storage medium stores instructions, and when the instructions are run on a computer, the computer is enabled to perform the method according to any one of the first aspect or the possible designs of the first aspect.

According to an eleventh aspect, a computer storage medium is provided. The computer-readable storage medium stores instructions, and when the instructions are run on a computer, the computer is enabled to perform the method according to any one of the second aspect or the possible designs of the second aspect.

According to a twelfth aspect, a computer program product including instructions is provided. The computer program product stores the instructions, and when the computer program product is run on a computer, the computer is enabled to perform the method according to any one of the first aspect or the possible designs of the first aspect.

According to a thirteenth aspect, a computer program product including instructions is provided. The computer program product stores the instructions, and when the computer program product is run on a computer, the computer is enabled to perform the method according to any one of the second aspect or the possible designs of the second aspect.

In this embodiment of this application, the terminal device may determine, based on the detection result of the first DCI, whether to receive the reference signal. If the terminal device determines not to receive the reference signal, the terminal device does not perform time and frequency synchronization with the network device. This reduces power consumption of the terminal device caused by time and frequency synchronization.

DESCRIPTION OF EMBODIMENTS

Figure 1:
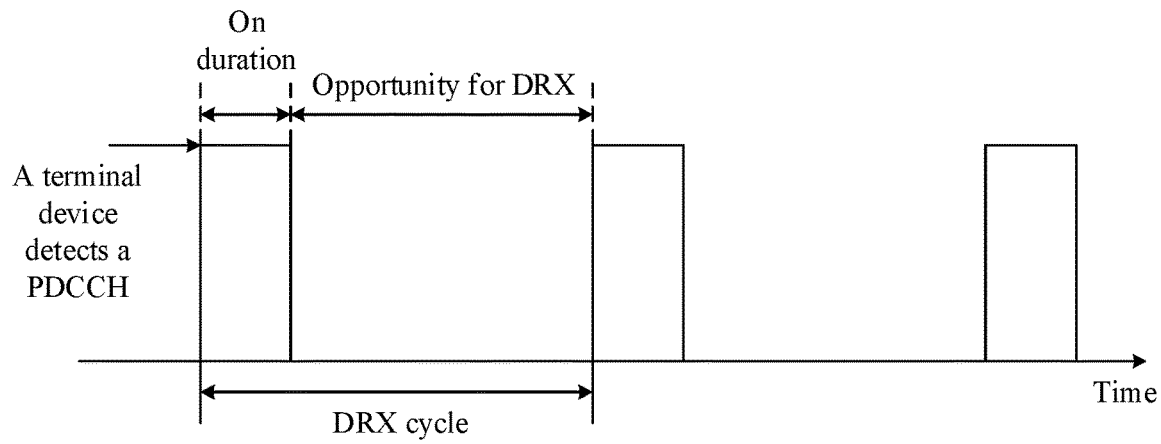
FIG. 1 is a schematic diagram of a DRX mechanism.

To make objectives, technical solutions and advantages of embodiments of this application clearer, the following further describes the embodiments of this application in detail with reference to the accompanying drawings.

In the following, some terms of the embodiments of this application are described, to help a person skilled in the art have a better understanding.

(1) A terminal device may be a device that provides voice and/or data connectivity for a user, for example, may include a handheld device with a wireless connection function, or a processing device connected to a wireless modem. The terminal device may communicate with a core network through a radio access network (RAN), and exchange voice and/or data with the RAN. The terminal device may be user equipment (UE), a wireless terminal device, a mobile terminal device, a device-to-device (D2D) terminal device, a vehicle-to-everything (V2X) terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may be a mobile phone (or referred to as a "cellular" phone), a computer having a mobile terminal device, a portable, pocket-sized, handheld, or a computer-built-in mobile apparatus, or the like. For example, the terminal device may be a device such as a personal communications service (PCS) phone, a cordless telephone set, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device, for example, a barcode, a radio frequency identification (RFID) device, a sensor, a global positioning system (GPS), or a laser scanner.

As an example instead of a limitation, the terminal device in the embodiments of this application may alternatively be a wearable device. The wearable device may also be referred to as a wearable intelligent device, an intelligent wearable device, or the like, and is a general term for wearable devices that are developed by using a wearable technology to perform intelligent design on daily wear, for example, glasses, gloves, a watch, clothes, and shoes. The wearable device is a portable device that is directly worn on a user or integrated into clothes or an accessory of the user. The wearable device is more than a hardware device, and implements a powerful function through software support, data exchange, and cloud interaction. On a broad note, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for detecting physical signs.

However, if the various terminal devices described above are located on a vehicle (for example, placed in the vehicle or installed in the vehicle), the terminal devices may be considered as in-vehicle terminal devices. For example, the in-vehicle terminal devices are also referred to as on-board units (OBU).

(2) A network device, for example, includes an access network (AN) device, for example, a base station (for example, an access point), and may be a device that communicates with a wireless terminal device on an air interface through one or more cells, or for example, an access network device in a V2X technology is a road side unit (RSU). The base station may be configured to perform mutual conversion between a received over-the-air frame and an Internet Protocol (IP) packet, and serve as a router between the terminal device and a remaining part of the access network, where the remaining part of the access network may include an IP network. The RSU may be a fixed infrastructure entity that supports a V2X application, and may exchange a message with another entity that supports the V2X application. The access network device may further coordinate attribute management of the air interface. For example, the access network device may be an evolved NodeB (eNB, or e-NodeB, evolved NodeB) in a Long Term Evolution (LTE) system or a Long Term Evolution-Advanced (LTE-A) system, a next generation NodeB (gNB) in a fifth generation mobile communications technology (the 5th generation, 5G) NR system, or a centralized unit (CU) and a distributed unit (DU) in a cloud radio access network (Cloud RAN) system. This is not limited in this embodiment of this application.

Certainly, the network device may further be a core network device. However, the technical solutions provided in the embodiments of this application mainly relate to an access network device. Therefore, unless otherwise specified, the "network device" described below all refer to an access network device.

(3) A downlink control channel may be a physical downlink control channel (PDCCH), an enhanced physical downlink control channel (EPDCCH), or another downlink control channel. This is not specifically limited.

(4) "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between associated objects. "At least one of the following items (pieces)" or a similar expression thereof means any combination of the items, including any combination of one item (piece) or a plurality of items (pieces). For example, at least one of a, b, or c may represent: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, and are not intended to limit an order, a time sequence, priorities, or importance of the plurality of objects. For example, first information and second information are merely intended to distinguish between different signaling, but do not indicate a difference of the two types of information in content, priority, sending sequence, importance, or the like.

The foregoing describes some concepts in the embodiments of this application, and the following describes technical features in the embodiments of this application.

The 3rd Generation Partnership Project (3GPP) standards organization is currently developing protocol standards for 5G NR. Compared with an LTE system, an NR system supports a larger transmission bandwidth, more transmit and receive antenna arrays, a higher transmission rate, and a more flexible scheduling mechanism with a smaller granularity. The foregoing features of the NR system provide a larger application scope for the NR system but cause a large increase in power consumption of the terminal device.

In view of this, the 3GPP introduces a power saving research subject in the NR system in the Rel-16 release, to study possible solutions that can reduce power consumption of terminal devices operating in various modes (including connected mode, idle mode, and inactive mode). How to reduce power consumption of a terminal device in radio resource control (RRC) connected mode is a research focus.

1. Discontinuous Reception (DRX) Mechanism

The DRX mechanism (also referred to as a DRX mode, a DRX state, or the like) is designed in the 3GPP for the LTE system, to reduce power consumption of the terminal device in connected mode. A basic time unit in the DRX mechanism is a DRX cycle or a DRX cycle, and a length of the DRX cycle is referred to as a DRX cycle.

The DRX mechanism is defined at a media access control (MAC) layer. The DRX mechanism may enable the terminal device to periodically enter sleep mode at some time (which may be defined as an inactive time), without monitoring a PDCCH masked by using a specified cell radio network temporary identifier (C-RNTI). Instead, in a period when monitoring is needed (which may be defined as an active time), the terminal device wakes up from the sleep mode and monitors these PDCCHs. This can reduce power consumption of the terminal device. For example, in a connected-DRX (C-DRX) mechanism for the NR system, DCI (or a PDCCH) masked by using the following identifiers needs to be monitored at the active time rather than the inactive time: a C-RNTI, a configured scheduling radio network temporary identifier (configured scheduling RNTI, CS-RNTI), an interruption RNTI (INT-RNTI), a slot format indicator-RNTI (SFI-RNTI), a semi-persistent channel state information RNTI (SP-CSI-RNTI), a transmit power control physical uplink control channel (PUCCH)-RNTI (transmit power control PUCCH RNTI, TPC-PUCCH-RNTI), a transmit power control physical uplink shared channel (PUSCH) RNTI (transmit power control PUSCH RNTI, TPC-PUSCH-RNTI), or a transmit power control sounding reference signal (SRS) RNTI (TPC-SRS-RNTI). In the NR system, sending of DCI (or a PDCCH) masked by using a system information RNTI (SI-RNTI), a paging RNTI (P-RNTI), a random access RNRI (RA-RNTI), and a temporary cell radio network temporary identifier (TC-RNTI) is not affected by the C-DRX mechanism. The DRX mechanism idle-DRX or C-DRX may be configured for the terminal device based on a status of the terminal device.

A discontinuous reception cycle (DRX cycle) is also referred to as a DRX cycle, and is a basic time unit in a DRX state. A length of the DRX cycle is referred to as a DRX cycle. The DRX cycle is classified into an out of active time (which may also be referred to as an inactive time) and an active period (which may also be referred to as an active time) based on behavior of the terminal device.

A state of the terminal device in the out of active time may be referred to as a sleep mode or may also be referred to as DRX_OFF in the embodiments of this application. The terminal device in sleep mode may choose, based on actual implementation, to disable communication components such as a radio frequency transceiver (or a receiver) and a baseband processor to reduce power consumption. Alternatively, the terminal device in sleep mode enables the radio frequency component, but only performs some monitoring processes with low power consumption, for example, monitoring some messages that the terminal device has to monitor, for example, a paging message, a broadcast message, or a system message. It should be noted that the terminal device in the inactive time does not receive a type of DCI on the PDCCH, for example, DCI used to schedule data, but may receive other DCI on the PDCCH that is not affected by whether the terminal device is in the active time, and may receive data from another physical channel, for example, a physical downlink shared channel (PDSCH), an acknowledgment (ACK), or a negative acknowledgment (NACK). For example, in the C-DRX mechanism for the NR system, the DCI masked by using the C-RNTI, the CS-RNTI, the INT-RNTI, the SFI-RNTI, the SP-CSI-RNTI, the TPC-PUCCH-RNTI, the TPC-PUSCH-RNTI, or the TPC-SRS-RNTI needs to be monitored in the active time rather than the inactive time. Sending of the DCI masked by using the SI-RNTI, the P-RNTI, the RA-RNTI, or the TC-RNTI in the NR system is not affected by the C-DRX mechanism.

In the embodiments of this application, the state of the terminal device in the active period may be referred to as a wake-up state or may also be referred to as DRX_ON. When the active time in the DRX cycle arrives, the terminal device is woken up, and monitors and receives the PDCCH. Therefore, the wake-up state is referred to as active mode in the embodiments of this application.

For the foregoing process, refer to FIG. 1. In FIG. 1, an opportunity for DRX indicates a DRX_OFF state.

It should be noted that generally, the terminal device wakes up several slots before entering an on duration state, and receives a reference signal from a network device, to perform time and frequency synchronization with the network device. This is to avoid a deviation between a clock of the system and a clock of a base station and a deviation between a working frequency of the system and a working frequency of the base station that are caused by long-time sleep of the terminal device. In addition, the terminal device may first attempt to receive a synchronization signal and an updated system message from the network device, to prevent a system message deviation after the terminal device moves from one cell to another cell.

2. Wake-Up Signal (Wake-Up Signaling, WUS)

The WUS is a control indication used to reduce power consumption of the terminal device.

When the terminal device is in idle mode, the terminal device is generally in sleep mode, but the terminal device needs to wake up at intervals to attempt to receive a paging message. A time at which the terminal device is woken up to receive the paging message is referred to as a paging occasion (PO). In an actual system, the base station does not send the paging message to the terminal device in all POs. Therefore, it is ineffective in most of the time that the terminal device is woken up in the PO to receive the paging message. This increases power consumption of the terminal device.

In view of this, the WUS is introduced in an NB-IoT system. If the base station sends a paging message to the terminal device in a PO, the base station sends the WUS before the PO arrives. Otherwise, the base station does not send the WUS. The terminal device attempts to receive the WUS before the PO arrives. Once the WUS is received, the terminal device determines that a paging message exists in a subsequent PO, and the UE attempts to receive the paging message. On the contrary, if the terminal device does not receive the WUS, the terminal device considers that the paging message does not exist in a subsequent PO, and the terminal device does not attempt to receive the paging message, and continues to sleep.

Power consumption and complexity of receiving the WUS are far less than power consumption and complexity of attempting to receive the paging message, and a probability that the base station sends the paging message to the terminal device in idle mode is not high. Therefore, the use of the WUS can greatly reduce power consumption of the terminal device.

A PDCCH-based wake-up indication function will be introduced to a power saving feature in the NR in the release-16, that is, the wake-up signal is sent through the PDCCH. This function applies to a terminal device configured with the DRX state. For a terminal device in connected mode in the NR system, when there is no data to be scheduled by the base station, the terminal device may enter the DRX mode to reduce power consumption. The terminal device attempts to blindly detect the PDCCH in an on duration period of the DRX mode. It is assumed that the terminal device receives, in the on duration period, the PDCCH used to schedule newly transmitted data. For example, a physical downlink shared channel (PDSCH) is scheduled. In this case, the terminal device starts (or restarts) an inactivity timer after the PDCCH used to schedule newly transmitted data is sent, continues to detect the PDCCH within a running time of the inactivity timer, and returns to an inactive state when the inactivity timer expires. However, if the terminal device does not receive any PDCCH within the on duration period, or the received PDCCH is not used to schedule the newly transmitted data and the on duration period ends, or the inactivity timer expires, the terminal device returns to the inactive time.

In the inactive time, the terminal device may disable a radio frequency transceiver, a baseband processing chip, a memory, or the like, and retain only a crystal oscillator clock. Certainly, which parts are to be disabled and which parts are to be retained by the terminal device depend on an implementation of the terminal device. This is merely an example rather than a limitation herein. Therefore, the terminal device mainly sleeps in the inactive time to reduce power consumption.

The terminal device still needs to monitor, in the active time, the PDCCH masked by using the specified C-RNTI, and the PDCCH that is masked by using the specified C-RNTI may not be sent to the terminal device in the active time in most cases. In other words, the base station does not schedule the terminal device in most cases. Therefore, monitoring the PDCCH by the terminal device in the active time actually wastes a large amount of power of the terminal device.

In view of this, the WUS may also be introduced in the NR system to reduce power consumption. A possible scheme for the WUS design is to reuse a PDCCH design in the existing NR system. To be specific, the WUS is designed as a downlink control channel, for example, the PDCCH. In this way, the terminal device can detect the WUS by detecting the PDCCH. This WUS design may be referred to as a PDCCH-based WUS, or referred to as a PDCCH-based power saving channel/signal.

Transmission of the PDCCH-based WUS (which may be referred to as PDCCH-WUS for short) needs to meet the following conditions:

(1) Search space of the PDCCH is in a DRX_OFF state, and is sent a period of time before the DRX_ON arrives. Alternatively, the search space of the PDCCH is in a DRX_ON state, and is sent one or more slots after the DRX_ON starts.

(2) In a subsequent DRX_ON period, there is a PDCCH that is sent to the current terminal device and that is used to schedule data. In other words, the base station sends the PDCCH-WUS only when the base station needs to schedule the terminal device to send data or receive data within DRX_ON, and the base station sends the PDCCH used to schedule data to the terminal device within DRX_ON. Otherwise, the base station does not send the PDCCH-WUS.

Figure 2:
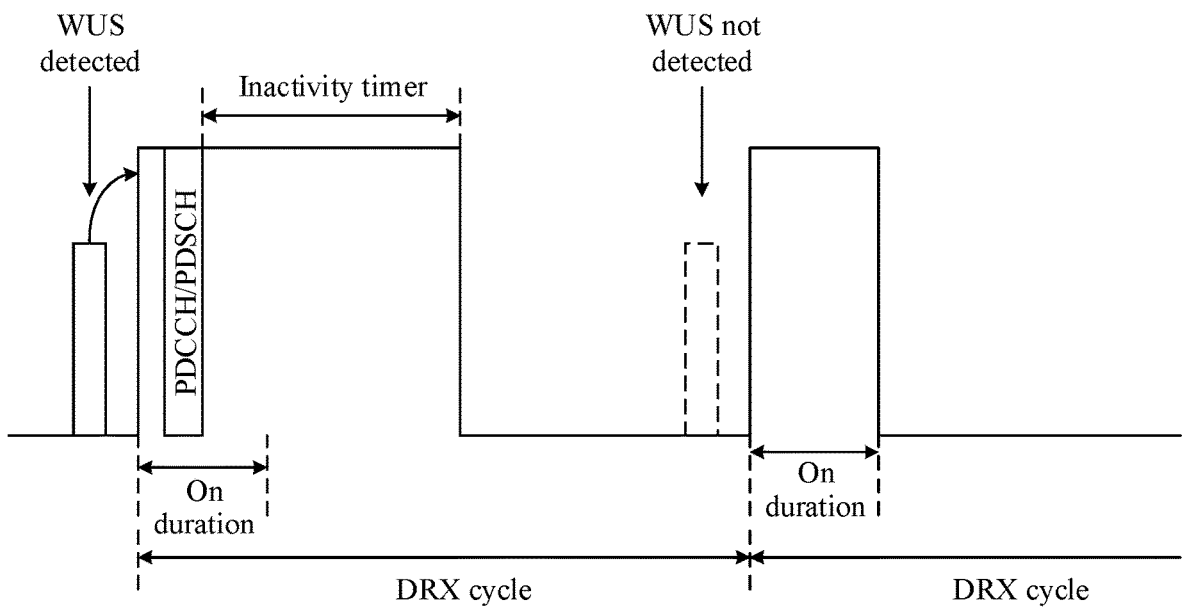
FIG. 2 is a schematic diagram of a PDCCH-WUS sending process.

For a sending process of the PDCCH-WUS, refer to FIG. 2. FIG. 2 is an example in which the PDCCH-WUS is sent a period of time before DRX_ON arrives. For the terminal device, before on duration of a DRX cycle arrives, the terminal device may detect the PDCCH-WUS on a fixed time-frequency resource if the base station configures the PDCCH-WUS.

If the terminal device detects the PDCCH-WUS, it indicates that data scheduling for the terminal device exists within the on duration corresponding to the PDCCH-WUS, and the terminal device needs to be woken up within the on duration to detect the PDCCH. If the PDCCH used to schedule newly transmitted data is detected, the terminal device starts or restarts the inactivity timer, and sends the PUSCH or receives the PDSCH based on the scheduling of the detected PDCCH.

If the terminal device detects no PDCCH-WUS, the terminal device may consider that there is no data scheduling for the terminal device within the on duration corresponding to the PDCCH-WUS. In this case, the terminal device may not detect the PDCCH within the on duration corresponding to the PDCCH-WUS. For example, the terminal device may continue to sleep within the on duration corresponding to the PDCCH-WUS, to reduce power consumption.

Time and frequency synchronization is necessary for PDSCH demodulation, especially for a PDSCH having a high modulation order, a high bit rate, and a large quantity of multiple-input multiple-output (MIMO) layers. The terminal device also first needs to perform time and frequency synchronization with the base station to send a physical uplink shared channel (PUSCH). Therefore, the terminal device first needs to perform time and frequency synchronization with the base station to receive downlink data from the base station or send uplink data to the base station. There is no CRS in the NR system. Therefore, the terminal device in connected mode generally performs time and frequency synchronization with the base station by using a TRS or an SSB. As the TRS or the SSB is periodically sent, the terminal device periodically performs time and frequency synchronization with the base station.

However, as described above, there is no PDCCH sent to the terminal device within the DRX_ON in most cases. However, the terminal device still periodically performs time and frequency synchronization with the base station. In this case, the terminal device does not need to demodulate the PDSCH. Therefore, time and frequency synchronization between the terminal device and the base station actually provides little practical benefit and instead causes high power consumption to the terminal device.

In addition, the terminal device in release-15 may wake up at a moment at which the SSB is sent to perform time and frequency synchronization and automatic gain control (AGC), so as to ensure data transmission performance. However, a period for sending the SSB is not necessarily the same as the DRX cycle. In some cases, there may be a time interval between a time domain position of the SSB and a time domain position of the on duration in DRX. After the terminal device performs time and frequency synchronization with the base station at the moment at which the SSB is sent, because the on duration has not arrived, the terminal device may enter sleep mode again and wake up at or before a time that the on duration arrives. However, a process in which the terminal device enters sleep mode and then wakes up from the sleep mode also consumes power, and causes a power waste of the terminal device.

In view of this, the technical solutions in the embodiments of this application are provided. In the embodiments of this application, a terminal device may determine, based on a detection result of first DCI, whether to receive a reference signal. If the terminal device determines not to receive the reference signal, the terminal device does not perform time and frequency synchronization with a network device. This reduces power consumption of the terminal device.

The technical solutions provided in the embodiments of this application may be applied to a 4th generation mobile communications technology (the 4th generation, 4G) system, for example, an LTE system; a 5G system, for example, an NR system; or a next-generation mobile communications system or another similar communications system. This is not specifically limited.

Figure 3:
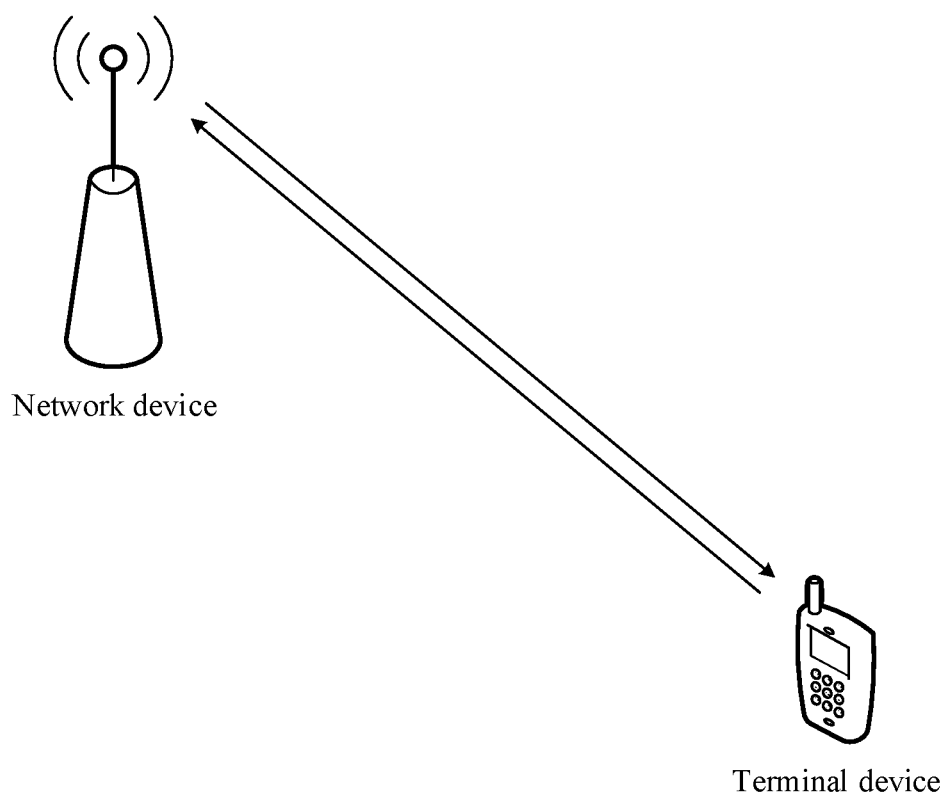
FIG. 3 is a schematic diagram of an application scenario of an embodiment of this application.

The following describes a network architecture to which an embodiment of this application is applied. Refer to FIG. 3.

FIG. 3 includes a network device and a terminal device, and the terminal device is connected to the network device. Certainly, a quantity of terminal devices in FIG. 3 is merely an example. In actual application, the network device may provide services for a plurality of terminal devices. The network device in FIG. 3 and some terminal devices in the plurality of terminal devices or each of the terminal devices may implement the technical solutions provided in the embodiments of this application. In addition, a mobile phone is used as an example of the terminal device in FIG. 3. This is not limited in actual application.

The network device in FIG. 3 may be an access network device, for example, a base station, or may be an RSU or another device. The base station corresponds to different devices in different systems. For example, the base station may correspond to an eNB in a 4G system, and may correspond to a gNB in a 5G system. Certainly, the technical solutions provided in the embodiments of this application may also be applied to a future mobile communications system. Therefore, the network device in FIG. 3 may correspond to an access network device in the future mobile communications system.

The following describes the technical solutions provided in the embodiments of this application with reference to the accompanying drawings.

Figure 4:
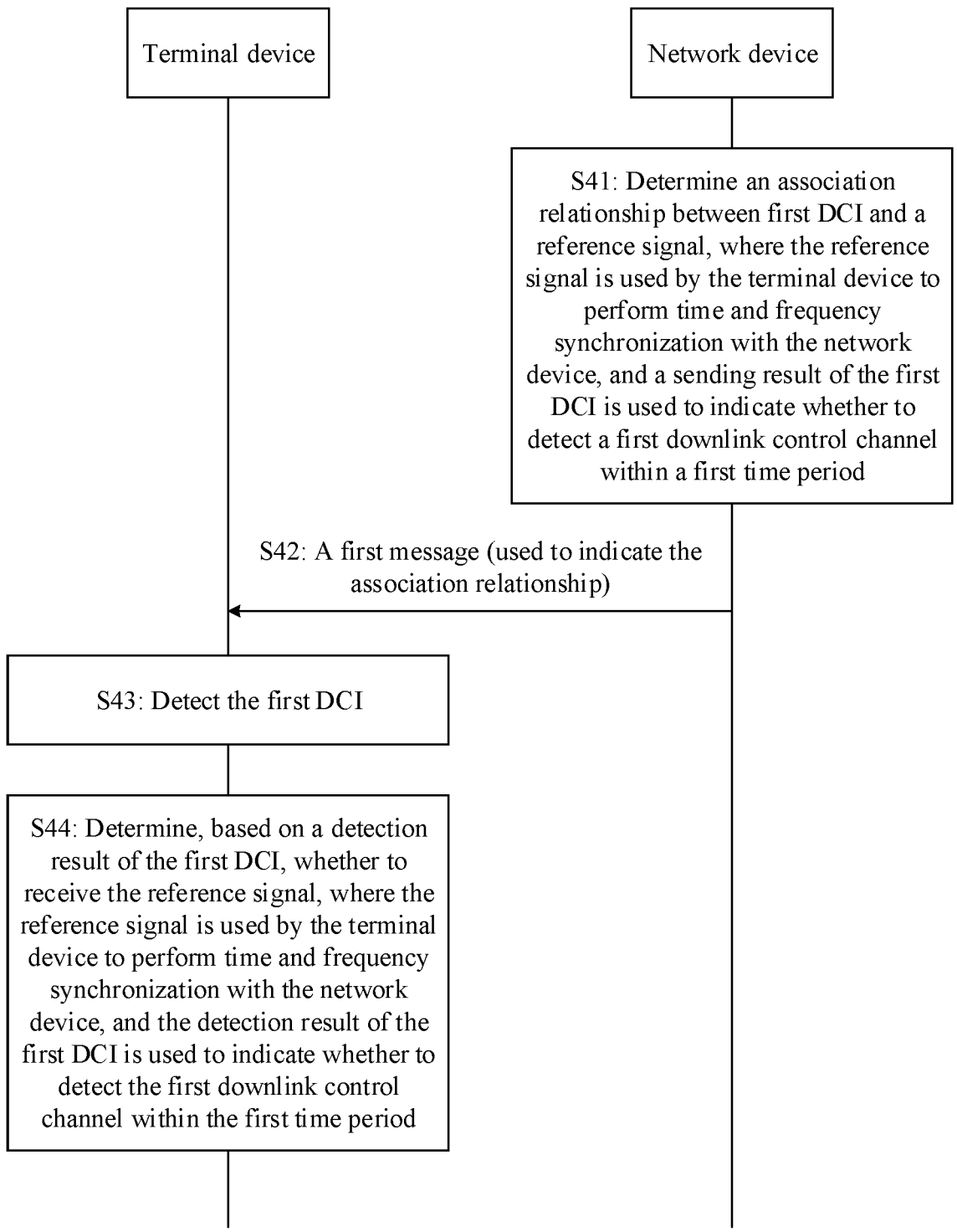
FIG. 4 is a flowchart of a communication method according to an embodiment of this application.

An embodiment of this application provides a first communication method. FIG. 4 is a flowchart of the method. In the following description process, an example in which the method is applied in the network architecture shown in FIG. 3 is used. In addition, the method may be performed by two communication apparatuses. The two communication apparatuses are, for example, a first communication apparatus and a second communication apparatus. The first communication apparatus may be a network device or a communication apparatus that can support a function required by the network device in implementing the method. Alternatively, the first communication apparatus may be a terminal device or a communication apparatus that can support a function required by the terminal device in implementing the method. Certainly, the first communication apparatus may be another communication apparatus, for example, a chip system. This is also applicable to the second communication apparatus. The second communication apparatus may be a network device or a communication apparatus that can support a function required by the network device in implementing the method. Alternatively, the second communication apparatus may be a terminal device or a communication apparatus that can support a function required by the terminal device in implementing the method. Certainly, the second communication apparatus may be another communication apparatus, for example, a chip system. In addition, implementations of the first communication apparatus and the second communication apparatus are not limited. For example, the first communication apparatus may be a network device, the second communication apparatus may be a terminal device. Alternatively, both the first communication apparatus and the second communication apparatus are network devices. Alternatively, both the first communication apparatus and the second communication apparatus are terminal devices. Alternatively, the first communication apparatus is a network device, and the second communication apparatus is a communication apparatus that can support a function required by the terminal device in implementing the method, and so on. The network device is, for example, a base station.

For ease of description, an example in which the method is performed by the network device and the terminal device is used in the following. In other words, an example in which the first communication apparatus is the network device and the second communication apparatus is the terminal device is used. For example, this embodiment is applied to the network architecture shown in FIG. 3. Therefore, the network device described below may be the network device in the network architecture shown in FIG. 3, and the terminal device described below may be the terminal device in the network architecture shown in FIG. 3.

S41: A network device determines an association relationship between first DCI and a reference signal. The reference signal is used by the terminal device to perform time and frequency synchronization with the network device, and a sending result of the first DCI is used to indicate whether to detect a first downlink control channel within a first time period.

The sending result of the first DCI is used to indicate whether to detect the first downlink control channel within the first time period. In an implementation, the first DCI may be used to implement a function of a WUS. It may be understood as follows: The first DCI is the WUS. Alternatively, in addition to information used to implement the function of the WUS, the first DCI further includes some other information such as information used to help the terminal device receive data within a DRX active time, for example, a bandwidth part (BWP) identifier (ID), aperiodic channel state information (CSI) trigger, or the like. Therefore, a sending result of the WUS can indicate whether the terminal device detects the first downlink control channel within the first time period.

The first time period may be a time period associated with the first DCI, or a time period corresponding to the first DCI. For example, the first time period may refer to one or more duration periods in a DRX cycle, or may refer to one or more active times in a DRX cycle. For example, the first time period may be an on duration period in a next DRX cycle after the detected first DCI, an active time in a next DRX cycle after the detected first DCI, a plurality of on duration periods in a next DRX cycle after the detected first DCI, or a plurality of active times in a next DRX cycle after the detected first DCI.

In this embodiment of this application, the first downlink control channel may be a downlink control channel affected by a DRX mechanism. Whether the terminal device needs to detect the first downlink control channel is affected by the DRX mechanism. If the terminal device is in an inactive time in the DRX cycle, the terminal device does not need to detect the first downlink control channel. The first downlink control channel may include one or more downlink control channels. In addition, there is a downlink control channel that is not affected by the DRX mechanism, and the downlink control channel is referred to as a second downlink control channel or the like. Whether the terminal device needs to detect the second downlink control channel is not affected by the DRX mechanism. Even if the terminal device is in the inactive time in the DRX cycle, the terminal device may need to detect the second downlink control channel. This is not limited in this embodiment of this application.

The first downlink control channel includes, for example, any one or combination of the following: a downlink control channel masked by using a cell radio network temporary identifier (C-RNTI), a downlink control channel masked by using a CS-RNTI, a downlink control channel masked by using an INT-RNTI, a downlink control channel masked by using an SFI-RNTI, a downlink control channel masked by using an SP-CSI-RNTI, a downlink control channel masked by using a TPC-PUCCH-RNTI, a downlink control channel masked by using a TPC-PUSCH-RNTI, or a downlink control channel masked by using a TPC-SRS-RNTI. Alternatively, the first downlink control channel may further include another downlink control channel, which is not specifically limited.

The sending result of the first DCI from a perspective of the network device and a detection result of the first DCI from a perspective of the terminal device may be considered as corresponding concepts if a packet loss case or the like is not considered. The sending result of the first DCI is used to indicate whether to detect the first downlink control channel within the first time period. There may be several different cases.

Case 1: The sending result of the first DCI is that when the network device sends the first DCI, the sending result of the first DCI is used to indicate to detect the first downlink control channel within the first time period. For the terminal device, Case 1 may be understood as follows: When the detection result of the first DCI is that the first DCI is detected, the detection result of the first DCI is used to indicate to detect the first downlink control channel within the first time period.

Case 2: The sending result of the first DCI is that when the network device sends the first DCI, the first DCI includes indication information used to indicate to detect the first downlink control channel within the first time period. For the terminal device, Case 2 may be understood as follows: When the detection result of the first DCI is that the terminal device detects the first DCI, and the first DCI indicates the terminal device to detect the first downlink control channel within the first time period, the detection result of the first DCI is used to indicate to detect the first downlink control channel within the first time period.

Case 3: The sending result of the first DCI is that when the network device sends the first DCI, the first DCI indicates not to detect the first downlink control channel within the first time period. For the terminal device, Case 3 may be understood as follows: When the detection result of the first DCI is that the terminal device detects the first DCI, the first DCI indicates not to detect the first downlink control channel within the first time period.

Case 4: The sending result of the first DCI is that when the network device does not send the first DCI, the sending result of the first DCI is used to indicate not to detect the first downlink control channel within the first time period. For the terminal device, Case 4 may be understood as follows: When the detection result of the first DCI is that no first DCI is detected, the detection result of the first DCI is used to indicate not to detect the first downlink control channel within the first time period.

Case 1 and Case 4 may alternatively be considered as one manner. In this manner, the network device indicates, by sending the first DCI or not, the terminal device to detect or not to detect the first downlink control channel within the first time period. The terminal device may determine that the first downlink control channel needs to be detected within the first time period provided that the first DCI is detected, and may determine that the first downlink control channel does not need to be detected within the first time period if no first DCI is detected. The manner is simple.

Case 2, Case 3, and Case 4 may alternatively be considered as one manner. In this manner, the first DCI sent by the network device may indicate the terminal device to detect or not to detect the first downlink control channel within the first time period. Therefore, even if the network device sends the first DCI, the terminal device may still be indicated not to detect the first downlink control channel within the first time period. This is more flexible. The terminal device may determine that the first downlink control channel does not need to be detected within the first time period provided that no first DCI is detected. If the first DCI is detected, the terminal device may determine, based on an indication of the first DCI, whether to detect the first downlink control channel within the first time period. The implementation is simpler and the indication is clearer.

If Case 1 and Case 4 are considered as one manner, and Case 2, Case 3, and Case 4 are considered as another manner, how the sending result of the first DCI indicates whether to detect the first downlink control channel within the first time period may be determined in either of the two manners.

In addition, the association relationship that is between the first DCI and the reference signal and that is determined by the network device may also include several different cases. For example, the association relationship may include a sub-relationship 1, a sub-relationship 2, a sub-relationship 3, or a sub-relationship 4.

The sub-relationship 1 is that when the network device sends the first DCI, the network device sends the reference signal. It may be understood as follows: If the network device sends the first DCI, the network device sends the reference signal. From a perspective of the terminal device, the sub-relationship 1 may be understood as follows: When the terminal device receives (or detects) the first DCI, the terminal device receives (or detects) the reference signal. It may be understood as follows: If the terminal device receives (or detects) the first DCI, the terminal device considers that the reference signal is also sent, and the terminal device may choose to receive (or detect) the reference signal.

In addition, the sub-relationship 1 and the foregoing case 1 may both be true. In other words, if the network device indicates, by sending the first DCI, the terminal device to detect the first downlink control channel within the first time period, the network device also sends the first DCI to indicate that the reference signal is to be sent. Since the network device sends the first DCI to indicate the terminal device to detect the first downlink control channel within the first time period, it indicates that the network device may schedule the terminal device to transmit data, or may schedule a PDSCH or a PUSCH. The terminal device needs to perform time and frequency synchronization with the network device to transmit data. Therefore, the network device may indicate, by sending the first DCI, that the reference signal is to be sent. Therefore, after detecting the reference signal, the terminal device may perform time and frequency synchronization with the network device, to receive the PDSCH from the network device, or send the PUSCH to the network device.

The sub-relationship 2 is that when the network device sends the first DCI and the first DCI indicates that the reference signal is to be sent, the network device sends the reference signal. It may be understood as follows: If the network device sends the first DCI, and the first DCI indicates that the reference signal is to be sent, the network device sends the reference signal. From a perspective of the terminal device, the sub-relationship 2 may be understood as follows: When the terminal device receives (or detects) the first DCI, and the first DCI indicates that the reference signal is to be sent, the terminal device considers that the reference signal is to be sent, and the terminal device may receive (or detect) the reference signal. It may be understood as follows: If the terminal device receives (or detects) the first DCI, and the first DCI indicates that the reference signal is to be sent, the terminal device may receive (or detect) the reference signal.

In addition, the sub-relationship 2 and the foregoing case 2 may both be true. In other words, if the network device indicates, by using the indication of the first DCI, the terminal device to detect the first downlink control channel within the first time period, the network device also indicates, by using the indication of the first DCI, that the reference signal is to be sent. Since the first DCI indicates to schedule the first downlink control channel, it indicates that the network device schedules the terminal device to transmit data, or may schedule the PDSCH or the PUSCH. The terminal device needs to perform time and frequency synchronization with the network device to transmit data. Therefore, the network device may indicate, by using the first DCI, that the reference signal is to be sent. Therefore, after detecting the reference signal, the terminal device may perform time and frequency synchronization with the network device, to receive the PDSCH from the network device, or send the PUSCH to the network device.

The sub-relationship 3 is that when the network device sends the first DCI, and the first DCI indicates that the reference signal is not to be sent, the network device does not send the reference signal. It may be understood as follows: If the network device sends the first DCI, and the first DCI indicates that the reference signal is not to be sent, the network device does not send the reference signal. From a perspective of the terminal device, the sub-relationship 2 may be understood as follows: When the terminal device receives (or detects) the first DCI, and the first DCI indicates that the reference signal is not to be sent, the terminal device does not receive (or detect) the reference signal. It may be understood as follows: If the terminal device receives (or detects) the first DCI, and the first DCI indicates that the reference signal is not to be sent, the terminal device does not need to receive (or detect) the reference signal.

In addition, the sub-relationship 3 and the foregoing case 3 may both be true. In other words, if the network device indicates, by using the indication of the first DCI, the terminal device not to detect the first downlink control channel within the first time period, the network device also indicates, by using the indication of the first DCI, that the reference signal is not to be sent. Since the first DCI indicates not to schedule the first downlink control channel, it indicates that the network device does not schedule the terminal device to transmit data, and the terminal device does not need to perform time and frequency synchronization with the network device. Then, the network device may indicate, by using the first DCI, that the reference signal is not to be sent. Therefore, the terminal device does not need to receive the reference signal or perform time and frequency synchronization with the network device. This reduces power consumption of the terminal device.

The sub-relationship 4 is that when the network device does not send the first DCI, the network device does not send the reference signal. It may be understood as follows: If the network device does not send the first DCI, the network device does not send the reference signal. From a perspective of the terminal device, the sub-relationship 4 may be understood as follows: When the terminal device does not receive (or does not detect) the first DCI, the terminal device does not need to receive (or detect) the reference signal. It may be understood as follows: If the terminal device does not receive (or does not detect) the first DCI, the terminal device does not need to receive (or detect) the reference signal.

In addition, the sub-relationship 4 and the foregoing case 4 may both be true. In other words, if the network device indicates, by skipping sending the first DCI, the terminal device not to detect the first downlink control channel within the first time period, the network device also indicates, by skipping sending the first DCI, that the reference signal is not to be sent. Since the network device skips sending the first DCI to indicate the terminal device not to detect the first downlink control channel within the first time period, it indicates that the network device does not schedule the terminal device to transmit data, and the terminal device does not need to perform time and frequency synchronization with the network device. Then, the network device may indicate, by skipping sending the first DCI, that the reference signal is not to be sent. Therefore, the terminal device does not need to receive the reference signal or perform time and frequency synchronization with the network device. This reduces power consumption of the terminal device.

The sub-relationship 1 and the sub-relationship 4 may be understood as different association relationships, or may be understood as two branches of a same association relationship. If the sub-relationship 1 and the sub-relationship 4 are understood as two branches of a same association relationship, in this association relationship, the network device indicates, by sending or not sending the first DCI, whether to send the reference signal. If the network device sends the first DCI, it indicates that the network device sends the reference signal. If the network device does not send the first DCI, it indicates that the network device does not send the reference signal. Therefore, the terminal device can determine, based on whether the first DCI is detected, whether to detect the reference signal. This implementation is simple.

Alternatively, the sub-relationship 2, the sub-relationship 3, and the sub-relationship 4 may be understood as different association relationships, or may be understood as different branches of a same association relationship. If the sub-relationship 2, the sub-relationship 3, and the sub-relationship 4 are understood as different branches of a same association relationship, in this association relationship, the first DCI sent by the network device may indicate whether the reference signal is to be sent. Therefore, even if the network device sends the first DCI, it may indicate that the reference signal is not to be sent. Therefore, the terminal device does not need to detect the reference signal. This manner is more flexible. For example, the network device sends the first DCI, which indicates that the network device schedules data, for example, schedules a PDSCH. However, a requirement for demodulation of the PDSCH scheduled by the network device is low, for example, a modulation order of the PDSCH is low. The terminal device can demodulate the PDSCH even if the terminal device does not perform time and frequency synchronization with the network device. In this case, the network device may indicate, by using the first DCI, that the reference signal is not to be sent. In this case, normal receiving and demodulation of the PDSCH by the terminal device are not affected, and power consumption of the terminal device can be reduced.

If the sub-relationship 1 and the sub-relationship 4 are considered as one association relationship, and the sub-relationship 2, the sub-relationship 3, and the sub-relationship 4 are considered as another association relationship, the foregoing association relationship may include one of the two association relationships.

In this embodiment of this application, an association relationship between the first DCI and the reference signal may be specified, so that sending of the reference signal may be controlled by using the association relationship. For example, the network device may send the reference signal based on the specified association relationship rather than on a periodic basis. In this case, the terminal device does not need to periodically receive the reference signal or periodically perform time and frequency synchronization with the network device. This reduces power consumption of the terminal device. Alternatively, behavior of the terminal device may be controlled by using the association relationship. The terminal device correspondingly receives the reference signal only based on the association relationship, and does not need to periodically receive the reference signal as in the prior art. Therefore, the terminal device only needs to perform time and frequency synchronization with the network device after receiving the reference signal rather than on a periodic basis. This reduces power consumption of the terminal device.

The reference signal may be used by the terminal device to perform time and frequency synchronization with the network device. For example, the reference signal is a TRS or an SSB, a channel state information-reference signal (CSI-RS), or the like. Alternatively, the reference signal may be used for another purpose. For example, the reference signal may be used to perform channel state estimation. Correspondingly, implementations of the reference signal may also be different, and this is not specifically limited.

S42: The network device sends a first message to the terminal device, and the terminal device receives the first message from the network device, where the first message is used to indicate the association relationship.

After determining the association relationship between the first DCI and the reference signal, the network device may send the association relationship to the terminal device. After receiving the first message, the terminal device may determine, based on the first message, that there is the association relationship between the first DCI and the reference signal. The first message may be higher layer signaling, for example, an RRC message, or another message.

In an optional implementation, the first message may be further used to configure a parameter of the first DCI. For example, the first message may be used to configure a resource, for example, a control resource set (CORESET) used to send the first DCI. Alternatively, the first message may be used to configure other information of the first DCI, for example, a monitoring opportunity. This is not specifically limited.

In addition, in addition to configuring the parameter of the first DCI, the first message may be further used to configure a resource used to send the reference signal. In this way, if the terminal device determines, based on the detection result of the first DCI, to receive the reference signal, the terminal device may receive the reference signal based on the resource that is configured by using the first message and that is used to send the reference signal. Alternatively, the resource used to send the reference signal may be configured for the terminal device in another manner. For example, a relative time-frequency domain position between the first DCI and the reference signal is predefined by using a protocol. In this case, the resource used to send the reference signal does not need to be configured by using the first message. A manner of notifying the terminal device of information about the resource used to send the reference signal is not limited in this embodiment of this application.

Alternatively, the association relationship between the first DCI and the reference signal may be specified by using the protocol. In this case, if the association relationship between the first DCI and the reference signal is specified by using the protocol, S42 may be performed, but the first message may be used to configure the first DCI but not used to indicate the association relationship between the first DCI and the reference signal.

S43: The terminal device detects the first DCI.

S44: The terminal device determines, based on the detection result of the first DCI, whether to receive the reference signal. The reference signal is used by the terminal device to perform time and frequency synchronization with the network device, and the detection result of the first DCI is further used to indicate whether to detect the first downlink control channel within the first time period.

As described in S41, the reference signal may be used for time and frequency synchronization, or may be used for another purpose. This is not specifically limited. How the detection result of the first DCI indicates whether to detect the first downlink control channel within the first time period is also described in S41. Details are not described herein again.

The sending result of the first DCI is used to indicate whether to detect the first downlink control channel within the first time period. For example, in Case 1, if the terminal device detects the first DCI in S43, and the terminal device may determine to detect the first downlink control channel within the first time period, the terminal device may detect the first downlink control channel within the first time period. Alternatively, the sending result of the first DCI is used to indicate whether to detect the first downlink control channel within the first time period. For example, in Case 2, if the terminal device detects the first DCI in S43, and the first DCI indicates to schedule the first downlink control channel, the terminal device may determine to detect the first downlink control channel within the first time period, and the terminal device may detect the first downlink control channel within the first time period. Alternatively, the sending result of the first DCI is used to indicate whether to detect the first downlink control channel within the first time period. For example, in Case 3, if the terminal device detects the first DCI in S43, and the first DCI indicates that the first downlink control channel does not need to be detected within the first time period, the terminal device may determine not to detect the first downlink control channel within the first time period, and the terminal device may not detect the first downlink control channel within the first time period. Alternatively, the sending result of the first DCI is used to indicate whether to detect the first downlink control channel within the first time period. For example, in Case 4, if the terminal device detects no first DCI in S43, and the terminal device may determine not to detect the first downlink control channel within the first time period, the terminal device may not detect the first downlink control channel within the first time period.

The terminal device may determine, in the following several manners and based on the detection result of the first DCI, whether to receive the reference signal: If the detection result is that the first DCI is detected, the terminal device determines that the reference signal is to be sent, and may receive the reference signal. Alternatively, if the detection result is that the first DCI is detected, and the first DCI indicates that the reference signal is to be sent, the terminal device determines that the reference signal is to be sent, and may receive the reference signal. Alternatively, if the detection result is that the first DCI is detected, and the first DCI indicates that the reference signal is not to be sent, the terminal device determines that the reference signal is not to be sent, and does not receive the reference signal. Alternatively, if the detection result is that no first DCI is detected, the terminal device determines that the reference signal is not to be sent, and does not receive the reference signal.

In an implementation, the determining, by the terminal device based on the detection result of the first DCI, whether to receive the reference signal may be related to the association relationship. In other words, the terminal device may determine, based on the detection result of the first DCI and the association relationship, whether to receive the reference signal. For example, the association relationship is the foregoing sub-relationship 1. In this case, if the terminal device detects the first DCI in S43, the terminal device may consider that the network device is to send the reference signal, and the terminal device may choose to receive the reference signal. For example, the terminal device may continue to perform detecting to receive the reference signal. After receiving the reference signal, the terminal device may perform time and frequency synchronization with the network device. Alternatively, it is assumed that the association relationship is the foregoing sub-relationship 2. In this case, if the terminal device detects the first DCI in S43 and the first DCI indicates that the reference signal is to be sent, the terminal device may consider that the network device is to send the reference signal, and the terminal device may choose to receive the reference signal. For example, the terminal device may continue to perform detecting to receive the reference signal. After receiving the reference signal, the terminal device may perform time and frequency synchronization with the network device. Alternatively, it is assumed that the association relationship is the foregoing sub-relationship 3. In this case, if the terminal device detects the first DCI in S43 and the first DCI indicates that the reference signal is not to be sent, the terminal device may consider that the network device does not send the reference signal, and the terminal device may determine not to receive the reference signal. For example, the terminal device may not need to detect the reference signal, and does not need to perform time and frequency synchronization with the network device. Alternatively, it is assumed that the association relationship is the foregoing sub-relationship 4. In this case, if the terminal device detects no first DCI in S43, the terminal device may consider that the network device does not send the reference signal, and the terminal device may determine not to receive the reference signal. For example, the terminal device may not need to detect the reference signal, and does not need to perform time and frequency synchronization with the network device.

If the terminal device can receive the reference signal, a time interval between a moment at which the terminal device receives the first DCI and a moment at which the terminal device receives the reference signal may be greater than a first value. The first value is, for example, configured by the network device, or may be specified in the protocol. Alternatively, the time interval between the moment at which the first DCI is received and the moment at which the reference signal is received may be directly configured or indicated in a network. The terminal device may receive the first DCI through a narrowband, and the terminal device may need to receive the reference signal through a wideband. Therefore, after receiving the first DCI, if the reference signal needs to be received, the terminal device needs to take a specific preparation time, so that a corresponding component of the terminal device completes preparation work such as startup or switchover. Therefore, in an implementation, the first value may be determined based on a capability of the terminal device. For example, if the first value is configured by the network device, the terminal device may send capability information of the terminal device to the network device in advance, so that the network device may determine the first value based on the capability information of the terminal device. Alternatively, the first value may be determined based on another factor. This is not specifically limited.

Certainly, if the terminal device can detect the first DCI in S43, it indicates that the network device is to send the first DCI. S43 may also be understood as that when the network device sends the first DCI, the terminal device receives the first DCI from the network device. Alternatively, if the network device detects no first DCI in S43, S43 may only be understood as that the terminal device detects the first DCI, but a detection result may be that the terminal device detects no first DCI.

If the association relationship is the foregoing sub-relationship 1 or the sub-relationship 2, the network device further sends the reference signal after sending the first DCI, and the terminal device may receive the reference signal. After receiving the reference signal, the terminal device may perform time and frequency synchronization with the network device. Specifically, a process in which the terminal device performs time and frequency synchronization with the network device is not described herein. Since the network device sends the first DCI, it indicates that the network device schedules data, for example, schedules the PDSCH or the PUSCH. After receiving the first DCI, the terminal device may continue to detect DCI used to schedule data, or continue to detect the first downlink control channel. For example, the terminal device detects second DCI. In other words, the terminal device receives the second DCI from the network device. The second DCI is used to schedule data, for example, used to schedule the PDSCH or the PUSCH. The second DCI may indicate a sending parameter of the data scheduled by the network device, and the sending parameter includes a modulation order or a quantity of MIMO layers of the data, or other information. After receiving the second DCI, the terminal device may determine to transmit the data scheduled by using the second DCI. In other words, the terminal device may normally receive or send the data scheduled by using the second DCI. For example, the terminal device may receive, based on scheduling by using the second DCI, the PDSCH from the network device, and perform operations such as demodulation on the PDSCH. Alternatively, the terminal device may send the PUSCH to the network device based on scheduling by using the second DCI.

Alternatively, if the association relationship is the foregoing sub-relationship 4, the network device does not send the reference signal after sending the first DCI. In this case, the terminal device does not need to receive the reference signal or perform time and frequency synchronization with the network device.

Alternatively, it is assumed that the association relationship is the foregoing sub-relationship 3, or that the network device sends the first DCI, and the first DCI indicates that the reference signal is not to be sent. In this case, the terminal device does not receive the reference signal or perform time and frequency synchronization with the network device based on the reference signal. However, since the network device sends the first DCI, and the first DCI indicates to monitor the first control channel within the first time period, it indicates that the network device schedules data, for example, may schedule the PDSCH or the PUSCH. After receiving the first DCI, the terminal device may continue to detect DCI used to schedule data, or continue to detect the first downlink control channel. For example, the terminal device detects second DCI. In other words, the terminal device receives the second DCI from the network device. The second DCI is used to schedule data, for example, used to schedule the PDSCH or the PUSCH. The second DCI may indicate the sending parameter of the data scheduled by the network device, and the sending parameter includes the modulation order or the quantity of MIMO layers of the data, or other information. Because the terminal device does not perform time and frequency synchronization with the network device, the terminal device may be incapable in handling processes such as higher-order symbol modulation, demodulation of a multi-layer MIMO data stream, and the like. Therefore, after receiving the second DCI, the terminal device may compare the sending parameter indicated by the second DCI with a preconfigured sending parameter, to determine whether the sending parameter indicated by the second DCI meets the preconfigured sending parameter. If the sending parameter indicated by the second DCI meets the preconfigured sending parameter, the terminal device may determine to transmit the data scheduled by using the second DCI. In other words, the terminal device may accept scheduling properly. For example, the terminal device may receive, based on scheduling by using the second DCI, the PDSCH from the network device, and perform operations such as demodulation on the PDSCH. Alternatively, the terminal device may send the PUSCH to the network device based on scheduling by using the second DCI. If the sending parameter indicated by the second DCI does not meet the preconfigured sending parameter, the terminal device may determine not to transmit the data scheduled by using the second DCI. For example, the terminal device may not receive the PDSCH scheduled by using the second DCI. Alternatively, the terminal device may not send the PUSCH scheduled by using the second DCI. In this case, the terminal device may consider that a scheduling error occurs. For the network device, if the network device sends the first DCI, and the first DCI indicates that the reference signal is not to be sent, the network device still tries to enable the sending parameter indicated by the sent second DCI to meet the preconfigured sending parameter, so as to reduce an error possibility.

That the sending parameter indicated by the second DCI meets the preconfigured sending parameter may mean that the sending parameter indicated by the second DCI is the same as the preconfigured sending parameter, or may alternatively mean that a requirement of the sending parameter indicated by the second DCI for the terminal device is lower than a requirement of the preconfigured sending parameter for the terminal device. For example, the sending parameter includes the modulation order. If the modulation order indicated by the second DCI is less than or equal to the preconfigured modulation order, it is considered that the modulation order indicated by the second DCI meets the preconfigured modulation order. If the modulation order indicated by the second DCI is greater than the preconfigured modulation order, it is considered that the modulation order indicated by the second DCI does not meet the preconfigured modulation order. For another example, the sending parameter includes the quantity of MIMO layers. If the quantity of MIMO layers indicated by the second DCI is less than or equal to a preconfigured quantity of MIMO layers, it is considered that the quantity of MIMO layers indicated by the second DCI meets the preconfigured quantity of MIMO layers. If the quantity of MIMO layers indicated by the second DCI is greater than the preconfigured quantity of MIMO layers, it is considered that the quantity of MIMO layers indicated by the second DCI does not meet the preconfigured quantity of MIMO layers.

If the sending parameter indicated by the second DCI does not meet the preconfigured sending parameter, the terminal device may be incapable in processing the data scheduled by using the second DCI. In this case, the terminal device may choose not to process the data. This reduces ineffective handling procedures and reduces power consumption of the terminal device.

The foregoing case may be considered as a case in which scheduling of the network device is limited. The case in which scheduling of the network device is limited may persist. For example, if the network device sends the first DCI, and the first DCI indicates that the reference signal is not to be sent, the case in which scheduling of the network device is limited may persist. Alternatively, the case in which scheduling of the network device is limited may not persist, but may exist for a specific period. The period may be understood as a time window. Outside the time window, the network device may continue to perform normal scheduling, and the terminal device may continue to perform normal receiving, without determining whether the sending parameter indicated by the second DCI meets the preconfigured sending parameter.

For example, the time window is a period of time after the first DCI. It may be understood as follows: A start moment of the time window is a moment at which the network device sends the first DCI, a moment at which the terminal device detects the first DCI, a moment at which the terminal device detects the second DCI, or the like. Duration of the time window may be configured by the network device. For example, the network device may configure the time window by using a first message or another message. Alternatively, the duration of the time window may be specified by the protocol. Therefore, scheduling of the network device is limited within the time window. After the time window ends, the network device may continue to perform normal scheduling, and the terminal device may also normally accept scheduling.

Alternatively, the time window is the first time period. The first time period has been described above, and details are not described herein again. Therefore, scheduling of the network device is limited within the first time period. After the first time period ends, the network device may continue to perform normal scheduling, and the terminal device may also normally accept scheduling.

Alternatively, the time window includes a time before an inactivity timer in an on duration period corresponding to the first DCI is not started. It may be understood as follows: In the on duration period corresponding to the first DCI, if the inactivity timer is not started, scheduling of the network device is limited; if the inactivity timer is started, the network device may continue normal scheduling, and the terminal device may also normally accept scheduling.

Alternatively, the time window includes a time period from a start moment of the first time period corresponding to the first DCI to a moment at which a last symbol or a last slot of a PDCCH or a PDSCH scheduled by using the second DCI is received.

Alternatively, the time window includes a time period from the start moment of the first time period corresponding to the first DCI to a start moment of a next symbol or a next slot after an ACK/NACK corresponding to the PDSCH scheduled by using the second DCI is received.

Certainly, there may be another implementation of the time window. The foregoing several cases are merely examples rather than limitations.

As the foregoing time window is defined, the terminal device may perform time and frequency synchronization by using the reference signal of the PDCCH or the PDSCH within the time window, to avoid that a transmission rate of the terminal device is relatively low for a long time because scheduling of the terminal device is limited for a long time within the first time period.

In this embodiment of this application, the association relationship between the first DCI and the reference signal may be specified, so that sending of the reference signal may be controlled by using the association relationship. For example, the network device may send the reference signal based on the specified association relationship rather than on a periodic basis. In this case, the terminal device does not need to periodically receive the reference signal or periodically perform time and frequency synchronization with the network device. This reduces power consumption of the terminal device. Alternatively, behavior of the terminal device may be controlled by using the association relationship. The terminal device correspondingly receives the reference signal only based on the association relationship, and does not need to periodically receive the reference signal as in the prior art. Therefore, the terminal device only needs to perform time and frequency synchronization with the network device after receiving the reference signal rather than on a periodic basis. This reduces power consumption of the terminal device.

In addition, the reference signal is associated with the first DCI, and the first DCI may implement the function of the WUS. If the association relationship indicates that the terminal device does not need to receive the reference signal, it indicates that the network device does not schedule data to the terminal device, or it indicates that data scheduled by the network device has a low requirement for the terminal device. Even if the terminal device does not perform time and frequency synchronization with the network device, the terminal device can process the data, and a process in which the terminal device receives the DCI can be implemented as well. Therefore, normal working of the terminal device is not affected.

The following describes, with reference to the accompanying drawings, apparatuses configured to implement the foregoing method in the embodiment of this application. Therefore, all the foregoing content may be used in subsequent embodiments, and repeated content is not described again.

Figure 5:
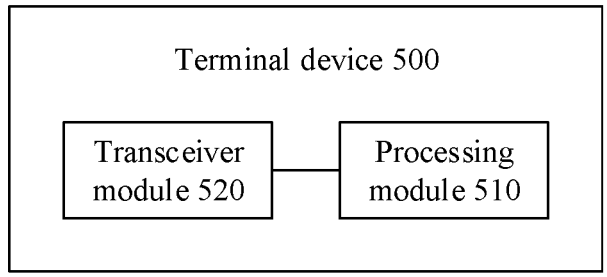
FIG. 5 is a schematic block diagram of a terminal device according to an embodiment of this application.

FIG. 5 is a schematic block diagram of a communication device 500 according to an embodiment of this application. For example, the communication device 500 is a terminal device 500. The terminal device 500 includes a processing module 510 and a transceiver module 520. The processing module 510 may be configured to perform all operations, such as S44, except a transceiver operation performed by the terminal device in the embodiment shown in FIG. 4, and/or configured to support other processes of the technologies described in this specification. The transceiver module 520 may be configured to perform all transceiver operations such as S42 and S43 performed by the terminal device in the embodiment shown in FIG. 4, and/or configured to support other processes of the technologies described in this specification.

The transceiver module 520 is configured to detect first downlink control information DCI.

The processing module 510 is configured to determine, based on a detection result of the first DCI, whether to receive a reference signal, where the reference signal is used by the terminal device 500 to perform time and frequency synchronization with a network device, and the detection result of the first DCI is further used to indicate whether to detect a first downlink control channel within a first time period.

In an optional implementation, the processing module 510 is configured to determine, in the following manner and based on the detection result of the first DCI, whether to receive the reference signal:

when the detection result is that the first DCI is detected, determining to receive the reference signal;

when the detection result is that the first DCI is detected, and the first DCI indicates that the reference signal is to be sent, determining to receive the reference signal;

when the detection result is that the first DCI is detected, and the first DCI indicates that the reference signal is not to be sent, determining not to receive the reference signal; or when the detection result is that no first DCI is detected, determining not to receive the reference signal.

In an optional implementation, the transceiver module 520 is further configured to receive a first message from the network device.

The processing module 510 is further configured to determine, based on the first message, that there is an association relationship between the first DCI and the reference signal.

The processing module 510 is configured to determine, in the following manner and based on the detection result of the first DCI, whether to receive the reference signal: determining, based on the detection result of the first DCI and the association relationship, whether to receive the reference signal.

The association relationship includes:

when the terminal device 500 detects the first DCI, the terminal device 500 detects the reference signal;

when the terminal device 500 detects no first DCI, the terminal device 500 does not detect the reference signal;

when the terminal device 500 detects the first DCI, and the first DCI indicates that the reference signal is to be sent, the terminal device 500 detects the reference signal; or when the terminal device 500 detects the first DCI, and the first DCI indicates that the reference signal is not to be sent, the terminal device 500 detects the reference signal.

In an optional implementation, when the detection result is that the first DCI is detected, and the first DCI indicates that the reference signal is not to be sent, the terminal device 500 determines not to receive the reference signal. After the processing module 510 determines, based on the detection result of the first DCI, whether to receive the reference signal, the transceiver module 520 is further configured to receive second DCI from the network device, where the second DCI is used to schedule data.

The processing module 510 is further configured to: when a sending parameter that is of the data and that is indicated by the second DCI does not meet a preconfigured sending parameter, determine not to transmit the data.

In an optional implementation, that the detection result of the first DCI is further used to indicate whether to detect a first downlink control channel within a first time period includes:

when the detection result is that the first DCI is detected, the detection result is used to indicate to detect the first downlink control channel within the first time period;

when the detection result is that the first DCI is detected and the first DCI indicates not to schedule the first downlink control channel, the detection result is used to indicate not to detect the first downlink control channel within the first time period;

when the detection result is that the first DCI is detected and the first DCI indicates to schedule the first downlink control channel, the detection result is used to indicate to detect the first downlink control channel within the first time period; or when the detection result is that no first DCI is detected, the detection result is used to indicate not to detect the first downlink control channel within the first time period.

In an optional implementation, the first downlink control channel includes any one or combination of the following:
a downlink control channel masked by using a C-RNTI;
a downlink control channel masked by using a CS-RNTI;
a downlink control channel masked by using an INT-RNTI;
a downlink control channel masked by using an SFI-RNTI;
a downlink control channel masked by using an SP-CSI-RNTI;
a downlink control channel masked by using a TPC-PUCCH-RNTI;
a downlink control channel masked by using a TPC-PUSCH-RNTI; or
a downlink control channel masked by using a TPC-SRS-RNTI.

In an optional implementation, a time interval between a moment at which the terminal device 500 receives the first DCI and a moment at which the terminal device 500 receives the reference signal is greater than a first value.

In an optional implementation, the reference signal is a CSI-RS, a TRS, or an SSB.

It should be understood that the processing module 510 in this embodiment of this application may be implemented by a processor or a processor-related circuit component, and the transceiver module 520 may be implemented by a transceiver or a transceiver-related circuit component.

Figure 6:
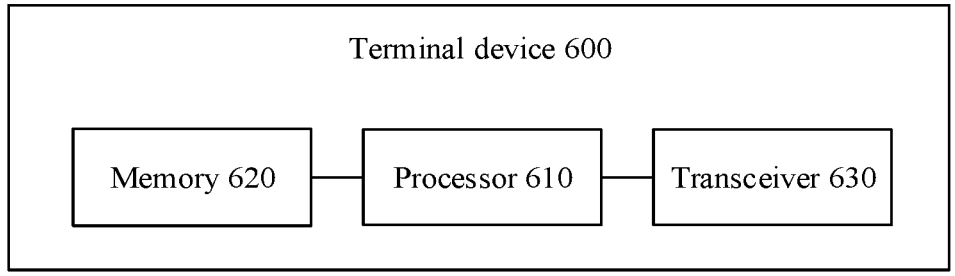
FIG. 6 is another schematic block diagram of a terminal device according to an embodiment of this application.

As shown in FIG. 6, an embodiment of this application further provides a communication device 600. For example, the communication device 600 is a terminal device 600. The terminal device 600 includes a processor 610, a memory 620, and a transceiver 630. The memory 620 stores instructions or a program. The processor 610 is configured to execute the instructions or the program stored in the memory 620. When the instructions or the program stored in the memory 620 are/is executed, the processor 610 is configured to perform the operation performed by the processing module 510 in the foregoing embodiment, and the transceiver 630 is configured to perform the operation performed by the transceiver module 520 in the foregoing embodiment.

It should be understood that the terminal device 500 or the terminal device 600 in the embodiments of this application may correspond to the terminal device in the embodiment shown in FIG. 4, and operations and/or functions of modules in the terminal device 500 or the terminal device 600 are used to implement corresponding procedures in the embodiment shown in FIG. 4. For brevity, details are not described herein again.

Figure 7:
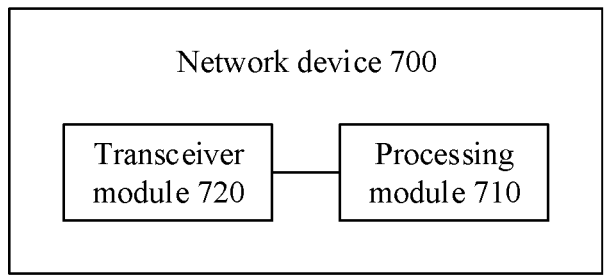
FIG. 7 is a schematic block diagram of a network device according to an embodiment of this application.

FIG. 7 is a schematic block diagram of a communication device 700 according to an embodiment of this application. For example, the communication device 700 is a network device 700. The network device 700 includes a processing module 710 and a transceiver module 720. The processing module 710 may be configured to perform all operations, such as S41, except a transceiver operation performed by the network device in the embodiment shown in FIG. 4, and/or configured to support other processes of the technologies described in this specification. The transceiver module 720 may be configured to perform all transceiver operations, such as S42, performed by the network device in the embodiment shown in FIG. 4, and/or configured to support other processes of the technologies described in this specification.

The processing module 710 is configured to determine an association relationship between first DCI and a reference signal, where the reference signal is used by a terminal device to perform time and frequency synchronization with the network device 700, and a sending result of the first DCI is used to indicate whether to detect a first downlink control channel within a first time period.

The transceiver module 720 is configured to send a first message to the terminal device, where the first message is used to indicate the association relationship.

In an optional implementation, the association relationship includes:
when the network device 700 sends the first DCI, the network device 700 sends the reference signal;
when the network device 700 does not send the first DCI, and the network device 700 does not send the reference signal;
when the network device 700 sends the first DCI, and the first DCI indicates that the reference signal is to be sent, the network device 700 sends the reference signal; or
when the network device 700 sends the first DCI, and the first DCI indicates that the reference signal is not to be sent, the network device 700 does not send the reference signal.

In an optional implementation, that a sending result of the first DCI is used to indicate whether to detect a first downlink control channel within a first time period includes:
when the sending result is that the first DCI is sent, the sending result is used to indicate to detect the first downlink control channel within the first time period;
when the sending result is that the first DCI is sent, and the first DCI indicates not to schedule the first downlink control channel, the sending result is used to indicate not to detect the first downlink control channel within the first time period;
when the sending result is that the first DCI is sent, and the first DCI indicates to schedule the first downlink control channel, the sending result is used to indicate to detect the first downlink control channel within the first time period; or
when the sending result is that the first DCI is not sent, the sending result is used to indicate not to detect the first downlink control channel within the first time period.

In an optional implementation, the transceiver module 820 is further configured to:
send the first DCI to the terminal device, where the first DCI indicates that the reference signal is not to be sent; and
send second DCI to the terminal device, where the second DCI is used to schedule data, and a sending parameter that is of the data and that is indicated by the second DCI meets a preconfigured sending parameter.

In an optional implementation, a time interval between a moment at which the network device 800 sends the first DCI and a moment at which the network device 800 sends the reference signal is greater than a first value.

In an optional implementation, the reference signal is a CSI-RS, a TRS, or an SSB.

It should be understood that the processing module 710 in this embodiment of this application may be implemented by a processor or a processor-related circuit component, and the transceiver module 720 may be implemented by a transceiver or a transceiver-related circuit component.

Figure 8:
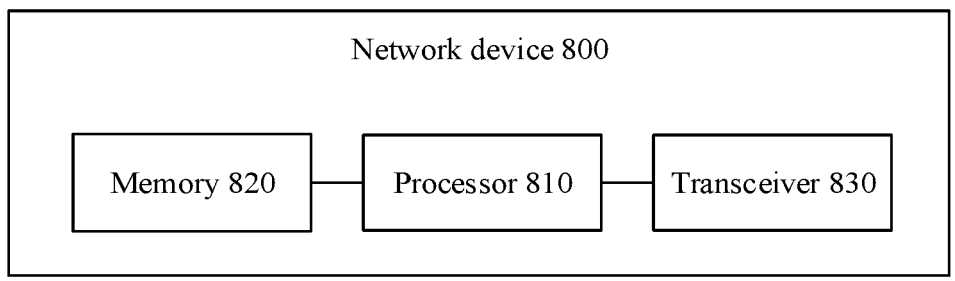
FIG. 8 is another schematic block diagram of a network device according to an embodiment of this application.

As shown in FIG. 8, an embodiment of this application further provides a communication device 800. For example, the communication device 800 is a network device 800. The network device 800 includes a processor 810, a memory 820, and a transceiver 830. The memory 820 stores instructions or a program, and the processor 810 is configured to execute the instructions or the program stored in the memory 820. When the instructions or the program stored in the memory 820 are/is executed, the processor 810 is configured to perform the operation performed by the processing module 710 in the foregoing embodiment, and the transceiver 830 is configured to perform the operation performed by the transceiver module 720 in the foregoing embodiment.

It should be understood that the network device 700 or the network device 800 in the embodiments of this application may correspond to the network device in the embodiment shown in FIG. 4, and operations and/or functions of modules in the network device 700 or the network device 800 are used to implement corresponding procedures in the embodiment shown in FIG. 4. For brevity, details are not described herein again.

An embodiment of this application further provides a communication apparatus. The communication apparatus may be a terminal device or a circuit. The communication apparatus may be configured to perform actions performed by the terminal device in the method embodiment shown in FIG. 4.

Figure 9:
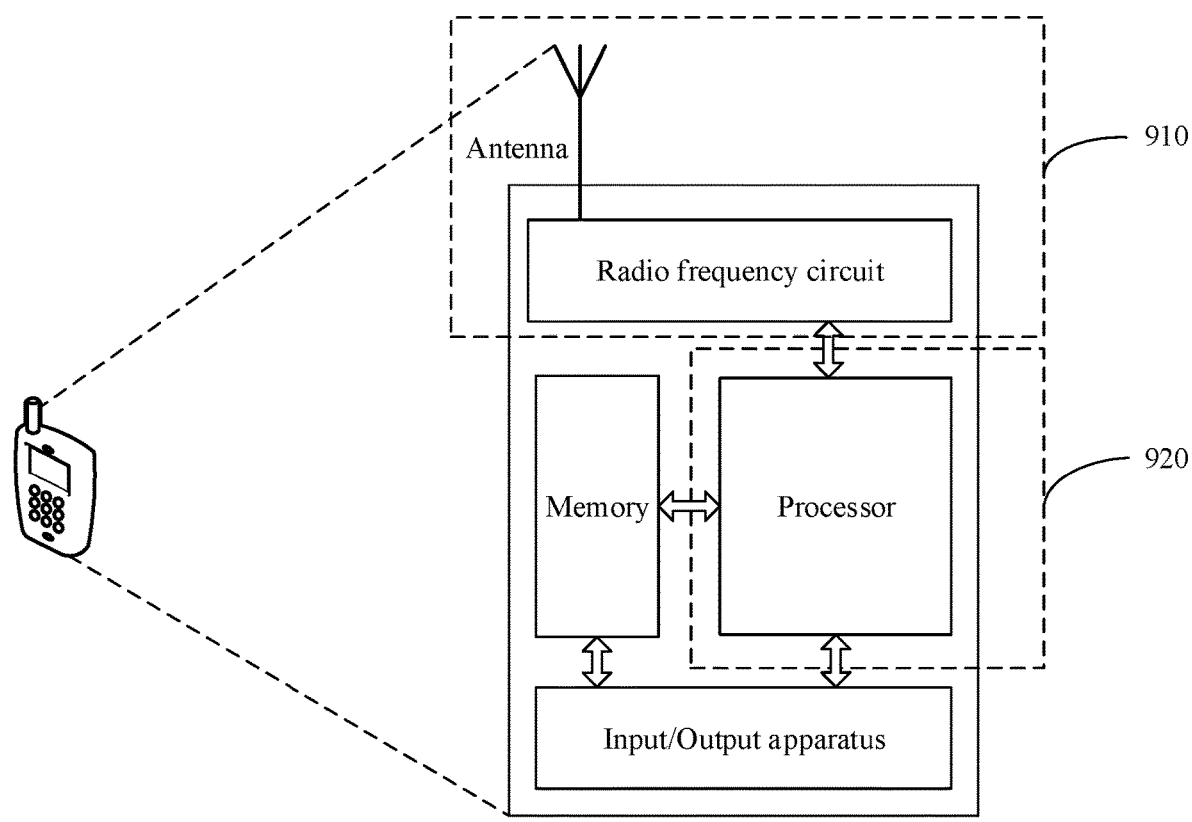
FIG. 9 is a schematic block diagram of a communication apparatus according to an embodiment of this application.

For example, the communication apparatus is a terminal device. FIG. 9 is a schematic diagram of a simplified structure of a terminal device. For ease of understanding and illustration, FIG. 9 is described by using an example in which the terminal device is a mobile phone. As shown in FIG. 9, the terminal device includes a processor, a memory, a radio frequency circuit, an antenna, and an input/output apparatus. The processor is mainly configured to: process a communications protocol and communication data, control the terminal device, execute a software program, process data of a software program, and the like. The memory is mainly configured to store software program and data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, for example, a touchscreen, a display screen, or a keyboard, is mainly configured to receive data input by a user, and output data to the user. It should be noted that some types of terminal devices may not have an input/output apparatus.

When the processor needs to send data, the processor performs baseband processing on the to-be-sent data, and outputs a baseband signal to the radio frequency circuit. After performing radio frequency processing on the baseband signal, the radio frequency circuit transmits a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiment of this application.

In this embodiment of this application, the antenna and the radio frequency circuit having a transceiver function may be considered as transceiver units of the terminal device, and a processor having a processing function may be considered as a processing unit of the terminal device. As shown in FIG. 9, the terminal device includes a transceiver unit 910 and a processing unit 920. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes a receiving unit and a sending unit. The transceiver unit sometimes may also be referred to as a transceiver, a transceiver circuit, or the like. The receiving unit sometimes may also be referred to as a receiver, a receiving circuit, or the like. The sending unit sometimes may also be referred to as a transmitter, a transmitter circuit, or the like.

It should be understood that the transceiver unit 910 is configured to perform a sending operation and a receiving operation of the terminal device side in the method embodiment shown in FIG. 4, and the processing unit 920 is configured to perform other operations other than the sending and receiving operations of the terminal device side in the method embodiment shown in FIG. 4.

For example, in an implementation, the transceiver unit 910 is configured to perform transceiver steps such as S42 and S43 of the terminal device side in the embodiment shown in FIG. 4, and/or is configured to support other processes of the technologies described in this specification. The processing unit 920 is configured to perform other operations, such as S44, other than the transceiver operation of the terminal device side in the embodiment shown in FIG. 4, and/or configured to support other processes of the technologies described in this specification.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 10:
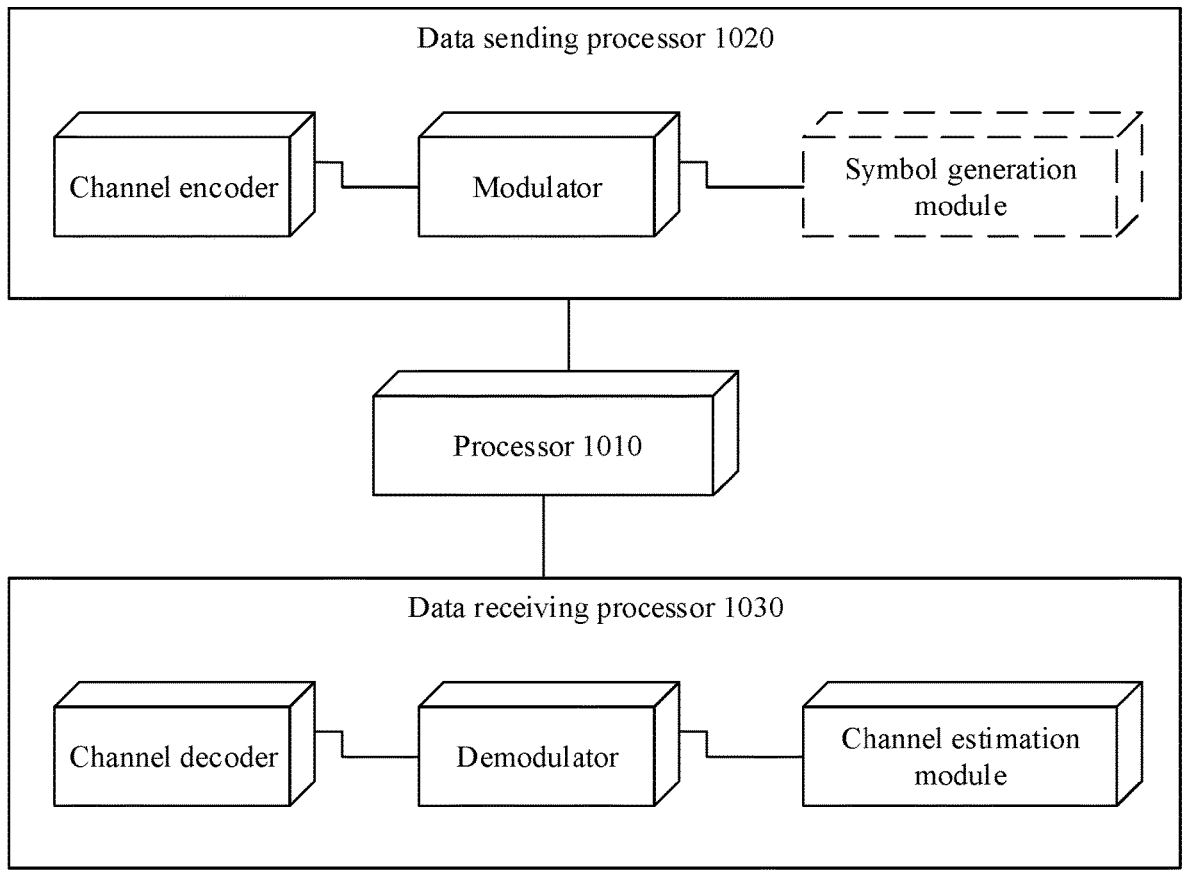
FIG. 10 is another schematic block diagram of a communication apparatus according to an embodiment of this application.

When the communication apparatus in this embodiment of this application is a terminal device, refer to a device shown in FIG. 10. In an example, the device may implement a function similar to that of a processor 1010 in FIG. 10. In FIG. 10, the device includes the processor 1010, a data sending processor 1020, and a data receiving processor 1030. The processing module 510 in the foregoing embodiment may be the processor 1010 in FIG. 10, and implements a corresponding function. The transceiver module 520 in the foregoing embodiment may be the data sending processor 1020 and/or the data receiving processor 1030 in FIG. 10.

Although FIG. 10 shows a channel encoder and a channel decoder, it may be understood that these modules are merely examples, and do not constitute limitative descriptions of this embodiment.

Figure 11:
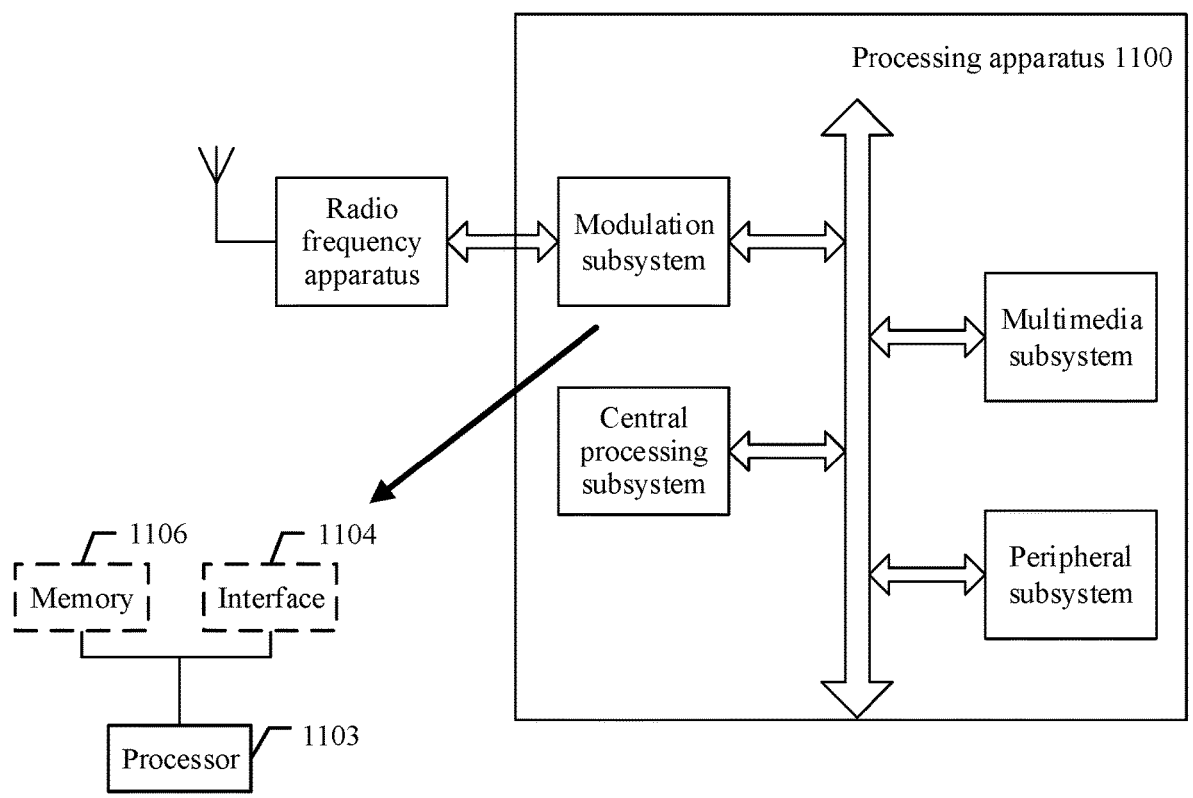
FIG. 11 is still another schematic block diagram of a communication apparatus according to an embodiment of this application.

FIG. 11 shows another form of this embodiment. A processing apparatus 1100 includes modules such as a modulation subsystem, a central processing subsystem, and a peripheral subsystem. A communication apparatus in this embodiment may be used as the modulation subsystem in the processing apparatus 1100. Specifically, the modulation subsystem may include a processor 1103 and an interface 1104. The processor 1103 completes a function of the processing module 510, and the interface 1104 completes a function of the transceiver module 520. In another example form, the modulation subsystem includes a memory 1106, the processor 1103, and a program stored in the memory 1106 that can be run on the processor. When executing the program, the processor 1103 implements the method on the terminal device side in the method embodiment shown in FIG. 4. It should be noted that the memory 1106 may be nonvolatile or volatile. The memory 1106 may be located inside the modulation subsystem, or may be located in the processing apparatus 1100, provided that the memory 1106 can be connected to the processor 1103.

An embodiment of this application further provides a computer-readable storage medium. The computer-readable storage medium stores a computer program. When the program is executed by a processor, a procedure related to a terminal device in the method embodiment shown in FIG. 4 may be implemented.

An embodiment of this application further provides a computer-readable storage medium. The computer-readable storage medium stores a computer program. When the program is executed by a processor, a procedure related to the network device in the method embodiment shown in FIG. 4 may be implemented.

An embodiment of this application further provides a computer program product including instructions. When the instructions are executed, the method on the terminal device side in the method embodiment shown in FIG. 4 is performed.

An embodiment of this application further provides a computer program product including instructions. When the instructions are executed, the method on the network device side in the method embodiment shown in FIG. 4 is performed.

It should be understood that, the processor mentioned in the embodiments of this application may be a central processing unit (CPU), and may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should further be understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that, in the embodiments of this application, sequence numbers of the foregoing processes do not mean execution sequences. The execution sequences of the processes should be determined based on functions and internal logic of the processes, and should not constitute any limitation to implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of the technical solutions. A person skilled in the art may use a different method to implement the described function for each particular application, but it should not be considered that the implementation goes beyond the scope of this application.

A person skilled in the art may clearly understand that, for the purpose of convenient and brief description, for detailed working processes of the foregoing system, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division, and may be another manner of division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located at one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or the part of the technical solutions may be embodied in a form of a software product. The computer software product is stored in a storage medium, and includes several instructions for enabling a computer device (which may be a personal computer, a server, a network device, or the like) to perform all or some of the steps of the method described in the embodiments of this application. The foregoing storage medium includes: any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be subject to the protection scope of the claims.

What is claimed is:

1. A communication method, comprising:
    detecting, by a terminal device, first downlink control information (DCI);
    determining, by the terminal device based on a detection result of the first DCI, whether to receive a reference signal, wherein the reference signal is used by the terminal device to perform time and frequency synchronization with a network device, and wherein the detection result of the first DCI is further used to indicate whether to detect a first downlink control channel within a first time period; and
    when the detection result is that the first DCI is detected and the first DCI indicates that the reference signal is not to be sent:
        determining, by the terminal device, not to receive the reference signal;
        receiving, by the terminal device, second DCI from the network device, wherein the second DCI is used to schedule data; and
        when a sending parameter that is of the data and that is indicated by the second DCI does not meet a preconfigured sending parameter, determining, by the terminal device, not to transmit the data.

2. The method according to claim 1, wherein the determining, by the terminal device based on a detection result of the first DCI, whether to receive a reference signal comprises at least one of the following:
    when the detection result is that the first DCI is detected, determining, by the terminal device, to receive the reference signal;
    when the detection result is that the first DCI is detected and the first DCI indicates that the reference signal is to be sent, determining, by the terminal device, to receive the reference signal;
    when the detection result is that the first DCI is not detected, determining, by the terminal device, not to receive the reference signal.

3. The method according to claim 1, wherein the method further comprises:
    receiving, by the terminal device, a first message from the network device; and
    determining, by the terminal device based on the first message, that there is an association relationship between the first DCI and the reference signal, wherein the determining, by the terminal device based on a detection result of the first DCI, whether to receive a reference signal comprises determining, by the terminal device based on the detection result of the first DCI and the association relationship, whether to receive the reference signal, and wherein the association relationship comprises at least one of the following:
        when the terminal device detects the first DCI, the terminal device detects the reference signal;
        when the terminal device does not detect the first DCI, the terminal device does not detect the reference signal;
        when the terminal device detects the first DCI and the first DCI indicates that the reference signal is to be sent, the terminal device detects the reference signal; or
        when the terminal device detects the first DCI and the first DCI indicates that the reference signal is not to be sent, the terminal device does not detect the reference signal.

4. The method according to claim 1, wherein that the detection result of the first DCI is further used to indicate whether to detect a first downlink control channel within a first time period comprises at least one of the following:
    when the detection result is that the first DCI is detected, the detection result is used to indicate to detect the first downlink control channel within the first time period;
    when the detection result is that the first DCI is detected and the first DCI indicates not to schedule the first downlink control channel, the detection result is used to indicate not to detect the first downlink control channel within the first time period;
    when the detection result is that the first DCI is detected and the first DCI indicates to schedule the first downlink control channel, the detection result is used to indicate to detect the first downlink control channel within the first time period; or
    when the detection result is that the first DCI is not detected, the detection result is used to indicate not to detect the first downlink control channel within the first time period.

5. The method according to claim 4, wherein the first downlink control channel comprises at least one of the following:
    a downlink control channel masked by using a cell radio network temporary identifier (C-RNTI);
    a downlink control channel masked by using a configured scheduling (CS)-RNTI;
    a downlink control channel masked by using an interruption (INT)-RNTI;
    a downlink control channel masked by using a slot format indicator (SFI)-RNTI;
    a downlink control channel masked by using a semi-persistent channel state information (SP-CSI)-RNTI;
    a downlink control channel masked by using a transmit power control (TPC)-physical uplink control channel (PUCCH)-RNTI;
    a downlink control channel masked by using a TPC-physical uplink shared channel (PUSCH)-RNTI; or
    a downlink control channel masked by using a TPC-sounding reference signal (SRS)-RNTI.

6. The method according to claim 1, wherein a time interval between a moment at which the terminal device receives the first DCI and a moment at which the terminal device receives the reference signal is greater than a first value.

7. The method according to claim 1, wherein the reference signal is a channel state information-reference signal (CSI-RS), a tracking reference signal (TRS), or a synchronization signal and physical broadcast channel block (SSB).

8. A communication method, comprising:
determining, by a network device, an association relationship between first downlink control information (DCI) and a reference signal, wherein the reference signal is used by a terminal device to perform time and frequency synchronization with the network device, and wherein a sending result of the first DCI is used to indicate whether to detect a first downlink control channel within a first time period;
sending, by the network device, a first message to the terminal device, wherein the first message is used to indicate the association relationship;
sending, by the network device, the first DCI to the terminal device, wherein the first DCI indicates that the reference signal is not to be sent; and
sending, by the network device, second DCI to the terminal device, wherein the second DCI is used to schedule data, and wherein a sending parameter that is of the data and that is indicated by the second DCI does not meet a preconfigured sending parameter.

9. The method according to claim 8, wherein the association relationship comprises at least one of the following:
when the network device sends the first DCI, the network device sends the reference signal;
when the network device does not send the first DCI, the network device does not send the reference signal; or
when the network device sends the first DCI and the first DCI indicates that the reference signal is to be sent, the network device sends the reference signal.

10. The method according to claim 8, wherein that a sending result of the first DCI is used to indicate whether to detect a first downlink control channel within a first time period comprises at least one of the following:
when the sending result is that the first DCI is sent, the sending result is used to indicate to detect the first downlink control channel within the first time period;
when the sending result is that the first DCI is sent and the first DCI indicates not to schedule the first downlink control channel, the sending result is used to indicate not to detect the first downlink control channel within the first time period;
when the sending result is that the first DCI is sent and the first DCI indicates to schedule the first downlink control channel, the sending result is used to indicate to detect the first downlink control channel within the first time period; or
when the sending result is that the first DCI is not sent, the sending result is used to indicate not to detect the first downlink control channel within the first time period.

11. A communication device, comprising:
a transceiver;
one or more processors; and
a non-transitory computer readable medium storing a program to be executed by the one or more processors, wherein the program comprises instructions that cause the communication device to perform operations comprising:
detecting, by the transceiver, first downlink control information (DCI);
determining, based on a detection result of the first DCI, whether to receive a reference signal, wherein the reference signal is used by a terminal device to perform time and frequency synchronization with a network device, and wherein the detection result of the first DCI is further used to indicate whether to detect a first downlink control channel within a first time period; and
when the detection result is that the first DCI is detected and the first DCI indicates that the reference signal is not to be sent:
determining not to receive the reference signal;
receiving, by the transceiver, second DCI from the network device, wherein the second DCI is used to schedule data; and
when a sending parameter that is of the data and that is indicated by the second DCI does not meet a preconfigured sending parameter, determining not to transmit the data.

12. The communication device according to claim 11, wherein determining, based on the detection result of the first DCI, whether to receive the reference signal comprises at least one of the following:
when the detection result is that the first DCI is detected, determining to receive the reference signal;
when the detection result is that the first DCI is detected and the first DCI indicates that the reference signal is to be sent, determining to receive the reference signal; or
when the detection result is that the first DCI is not detected, determining, by the terminal device, not to receive the reference signal.

13. The communication device according to claim 11, wherein the operations further comprise at least one of the following:
receiving, by the transceiver, a first message from the network device;
determining, based on the first message, that there is an association relationship between the first DCI and the reference signal, wherein determining, based on the detection result of the first DCI, whether to receive the reference signal comprises determining, based on the detection result of the first DCI and the association relationship, whether to receive the reference signal, and wherein the association relationship comprises:
when the terminal device detects the first DCI, the terminal device detects the reference signal;
when the terminal device does not detect the first DCI, the terminal device does not detect the reference signal;
when the terminal device detects the first DCI and the first DCI indicates that the reference signal is to be sent, the terminal device detects the reference signal; or
when the terminal device detects the first DCI and the first DCI indicates that the reference signal is not to be sent, the terminal device does not detect the reference signal.

14. The communication device according to claim 11, wherein that the detection result of the first DCI is further used to indicate whether to detect a first downlink control channel within a first time period comprises at least one of the following:
when the detection result is that the first DCI is detected, the detection result is used to indicate to detect the first downlink control channel within the first time period;
when the detection result is that the first DCI is detected and the first DCI indicates not to schedule the first downlink control channel, the detection result is used to indicate not to detect the first downlink control channel within the first time period;

when the detection result is that the first DCI is detected and the first DCI indicates to schedule the first downlink control channel, the detection result is used to indicate to detect the first downlink control channel within the first time period; or the detection result is that the first DCI is not detected, the detection result is used to indicate not to detect the first downlink control channel within the first time period.

15. The communication device according to claim 14, wherein the first downlink control channel comprises at least one of the following:
   a downlink control channel masked by using a cell radio network temporary identifier (C-RNTI);
   a downlink control channel masked by using a configured scheduling (CS)-RNTI;
   a downlink control channel masked by using an interruption (INT)-RNTI;
   a downlink control channel masked by using a slot format indicator (SFI)-RNTI;
   a downlink control channel masked by using a semi-persistent channel state information (SP-CSI)-RNTI;
   a downlink control channel masked by using a transmit power control (TPC)-physical uplink control channel (PUCCH)-RNTI;
   a downlink control channel masked by using a TPC-physical uplink shared channel (PUSCH)-RNTI; or
   a downlink control channel masked by using a TPC-sounding reference signal (SRS)-RNTI.

16. The communication device according to claim 11, wherein a time interval between a moment at which the terminal device receives the first DCI and a moment at which the terminal device receives the reference signal is greater than a first value.

17. The communication device according to claim 11, wherein the reference signal is a channel state information-reference signal (CSI-RS), a tracking reference signal (TRS), or a synchronization signal and physical broadcast channel block (SSB).

* * * * *

UNITED STATES PATENT AND TRADEMARK OFFICE
CERTIFICATE OF CORRECTION

PATENT NO. : 12,063,597 B2
APPLICATION NO. : 17/524482
DATED : August 13, 2024
INVENTOR(S) : Xiaolei Tie, Han Zhou and Meng Hua Page 1 of 1

It is certified that error appears in the above-identified patent and that said Letters Patent is hereby corrected as shown below:

In the Claims

In Column 41, In Line 57, In Claim 2, after "signal;" insert -- or --.

Signed and Sealed this
Nineteenth Day of November, 2024

Katherine Kelly Vidal
*Director of the United States Patent and Trademark Office*